US012702124B2

(12) United States Patent
Luciano et al.

(10) Patent No.: US 12,702,124 B2
(45) Date of Patent: Aug. 11, 2026

(54) APPARATUS AND METHOD FOR DETECTING INSECTS

(71) Applicant: FaunaPhotonics Agriculture & Environmental A/S, Copenhagen (DK)

(72) Inventors: Rubens Monteiro Luciano, Copenhagen (DK); Alfred Gösta Viktor Strand, Copenhagen (DK); Christoffer Grønne, Copenhagen (DK); Ea Hørsving, Copenhagen (DK); Albert Sylvester Løhde, Copenhagen (DK)

(73) Assignee: FaunaPhotonics Agriculture & Environmental A/S, Copenhagen (DK)

( * ) Notice: Subject to any disclaimer, the term of this patent is extended or adjusted under 35 U.S.C. 154(b) by 0 days.

(21) Appl. No.: 18/865,924

(22) PCT Filed: May 15, 2023

(86) PCT No.: PCT/EP2023/062957

§ 371 (c)(1),
(2) Date: Nov. 14, 2024

(87) PCT Pub. No.: WO2023/222594

PCT Pub. Date: Nov. 12, 2023

(65) Prior Publication Data

US 2025/0194576 A1 Jun. 19, 2025

(30) Foreign Application Priority Data

May 17, 2022 (EP) .................................... 22173881

(51) Int. Cl.
*A01M 1/00* (2006.01)
*G06V 10/143* (2022.01)
(Continued)

(52) U.S. Cl.
CPC ............ *A01M 1/00* (2013.01); *G06V 10/143* (2022.01); *G06V 10/764* (2022.01);
(Continued)

(58) Field of Classification Search
CPC ...... A01M 1/00; A01M 1/026; A01M 31/002; A01M 5/00; G06V 10/143; G06V 10/764;
(Continued)

(56) References Cited

U.S. PATENT DOCUMENTS 9,295,245 B1 * 3/2016 Guice .................. A01M 1/026
11,102,969 B2 8/2021 Peters et al.
(Continued)

FOREIGN PATENT DOCUMENTS

WO 2021/138586 A1 7/2021
WO 2021165479 A1 8/2021

OTHER PUBLICATIONS

International Search Report and Written Opinion issued in PCT/EP2023/062957, mailed Aug. 8, 2023 [10 Pages].

*Primary Examiner* — Peet Dhillon
(74) *Attorney, Agent, or Firm* — ICE MILLER LLP; Justin D. Swindells

(57) ABSTRACT

An insect detection system for detection of insects, the insect detection system comprising an insect sensor configured to acquire sensor data indicative of one or more insect detection events, each insect detection event being indicative of one or more detected insects in a probe volume of the insect sensor, the acquired sensor data being further indicative of at least one insect signature, and one or more image sensors each configured to obtain one or more digital images of at least part of the probe volume of the insect sensor, wherein the insect detection system is configured to create one or
(Continued)

more classification datasets by pairing the acquired sensor data with the one or more images from each of the one or more image sensors.

20 Claims, 6 Drawing Sheets

(51) Int. Cl.

| | |
|---|---|
| ***G06V 10/764*** | (2022.01) |
| ***G06V 10/774*** | (2022.01) |
| ***G06V 20/56*** | (2022.01) |
| ***G06V 40/00*** | (2022.01) |
| ***H04N 7/18*** | (2006.01) |
| ***H04N 23/56*** | (2023.01) |
| ***H04N 23/71*** | (2023.01) |

(52) U.S. Cl.
CPC ............ *G06V 10/774* (2022.01); *G06V 20/56* (2022.01); *G06V 40/00* (2022.01); *H04N 7/188* (2013.01); *H04N 23/56* (2023.01); *H04N 23/71* (2023.01)

(58) Field of Classification Search
CPC ...... G06V 10/774; G06V 20/56; G06V 40/00; H04N 23/56; H04N 23/71; H04N 7/188
See application file for complete search history.

(56) References Cited

U.S. PATENT DOCUMENTS

| | | | | |
|---|---|---|---|---|
| 2017/0273290 | A1* | 9/2017 | Jay | A01M 1/026 |
| 2018/0065747 | A1* | 3/2018 | Cantrell | G05D 1/0011 |
| 2019/0066475 | A1* | 2/2019 | Bordelon | A01M 29/24 |
| 2020/0019765 | A1* | 1/2020 | Ampatzidis | G06N 3/0464 |
| 2021/0329906 | A1 | 10/2021 | Taarnhoj et al. | |
| 2021/0342597 | A1 | 11/2021 | Rydhmer et al. | |
| 2022/0189326 | A1* | 6/2022 | Hamminga | G01S 13/72 |

* cited by examiner 125a
122a
124a,b,c,d
125b
122c
120
125c
125d
150
122d
122b

APPARATUS AND METHOD FOR DETECTING INSECTS

CROSS-REFERENCE TO RELATED APPLICATIONS

This application is a National Stage of International Patent Application No. PCT/EP2023/062957, filed on May 15, 2023, which claims priority to European Patent Application No. EP 22173881.8, filed on May 17, 2022, the disclosures of which are incorporated by reference in their entireties.

TECHNICAL FIELD

The present disclosure relates to an apparatus and method for detecting insects, such as flying insects.

BACKGROUND

There are many applications where it is desirable to detect and either classify or identify insects, such as flying insects. For example, in pest control applications, it is desirable to identify the presence of certain pests so as to target the pest control to specific pests.

In addition, it may often be desirable to classify or identify insects without a need to capture, kill, or otherwise immobilize the insect. Moreover, it may be desirable to remotely identify an insect. Particularly, it would be advantageous to be able to classify and/or identify insects in a geographic area, such as an agricultural field for growing crops, or an area of forest. It is advantageous if this could be done in an automated manner.

It is thus desirable to provide a low complex system that provides high quality data for detection and classification and/or identification of insects, such as flying insects.

SUMMARY

According to an aspect, disclosed herein are embodiments of a method for detection of insects, the method comprising the steps:

providing an insect detection system for detection of insects, the system comprising an insect sensor configured to acquire sensor data indicative of one or more insect detection events, and one or more image sensors each configured to obtain one or more digital images, acquiring sensor data from the insect sensor, the sensor data being indicative of one or more insect detection events, each insect detection event being indicative of one or more detected insects in a probe volume of the insect sensor, the acquired sensor data being further indicative of at least one insect signature, obtaining one or more images of at least part of the probe volume of the insect sensor from each of the one or more image sensors, creating one or more classification datasets by pairing the acquired sensor data with the one or more images from each of the one or more image sensors.

Pairing refers to associating sensor data from the insect sensor with digital image(s) from the one or more image sensors. No restriction on the number of sensor data or number of digital images is intended. Rather, the pairing refers to association of information from each of the two types of sensor: insect sensor and image sensor.

According to another aspect, disclosed herein are embodiments of a method for detection of insects, the method comprising the steps:

providing an insect detection system for detection of insects, the system comprising an insect sensor configured to acquire sensor data indicative of one or more insect detection events, and an image sensor configured to obtain one or more digital images of the one or more detected insects, acquiring sensor data from the insect sensor, the sensor data being indicative of one or more insect detection events, each insect detection event being indicative of one or more detected insects in a probe volume of the insect sensor, the acquired sensor data being further indicative of at least one insect signature, obtaining, in response to the one or more insect detection events, one or more images of the one or more detected insects from the image sensor in response to the one or more insect detection events.

An insect signature is a measurable attribute, such as an optically detectable attribute, which can be utilized in the classification of the detected insect. Examples of an insect signature is: a wing beat frequency, a trajectory, a body-wing ratio, a relative or absolute total size, a relative or absolute body size, a relative or absolute wing size, a glossiness measure, a melanisation measure, etc. For the purpose of the present description, an insect signature is a measurable attribute different from a digital image. In some embodiments, the sensor data is indicative of a time-resolved quantitative measurement. Other examples of an insect signature are: a characteristic modulated electric field pattern, such as a characteristic modulated electric field pattern correlated or associated with one or more fundamental wing beat frequencies, and/or a characteristic modulated electric field pattern correlated or associated with one or more harmonics of a fundamental wing beat frequency. A characteristic modulated electric field pattern or a wing beat frequency may be determined at least in part from modulated electric field data. A wing beat frequency may be a free flight wing beat frequency, i.e. the frequency of wing beats of a free flying insect, or a perching wing beat frequency, i.e. the frequency of wing beats of an insect sitting on a surface. Thus, the insect sensor system allows for detection, and possibly classification and/or identification of insects, and does so supported by an analysis of acquired sensor data.

The process provides both sensor data indicative of at least one insect signature, which can be utilized in the classification of the one or more detected insects, and at least one digital image of the probe volume of the insect sensor from each of the one or more image sensors and/or of the one or more insects. Attaining both an image and an insect signature of a detected insect may have a number of uses, such as e.g. improving prediction accuracy of an algorithm for classification and/or identification of an insect or e.g. for training a machine-learning model to classify an insect.

For example, the sensor data and image data may be used as input for a classification algorithm so as to arrive at a type, e.g. species, of the insect detected.

In some embodiments, the method further comprises:

creating one or more training datasets for a machine-learning model from the one or more classification datasets, receiving, by a machine-learning model, the one or more training datasets, and classifying, by the machine-learning model, the acquired sensor data into respective types, e.g. species, of insect from the one or more training datasets so as to generate a trained machine-learning model that is trained to classify acquired sensor data into types of insect.

Thus, the at least one insect signature and the one or more images may be used as training datasets for a machine-learning model. For example, the one or more images may be used with image recognition software that can determine the type, e.g. species, of an insect and from this, the machine-learning model can be trained to recognise the type, e.g. species, of insect based on the at least one insect signature. Alternatively, or additionally, the type, e.g. species, of insect may be determined from the one or more images by a user. The training datasets may also be used the other way around to train a machine-learning model to recognise the type, e.g. species, of insect from the one or more images based on a classification determined from the at least one insect signature. The trained machine-learning model may be implemented in an insect detection system.

Further, acquiring sensor data that indicates both detection of an insect as well as an insect signature means that the method is simpler than if the detection and signature measurement was done by separate sensors.

Alternatively, or additionally, the created classification datasets may be used for evaluating a classification model, such as for evaluating a trained machine-learning model. Thus, the created classification datasets may be used to determine an evaluation metric, such as an accuracy score. For example, the created classification datasets may be used to determine an accuracy score, where the accuracy score may be the number of correct predictions made by a classification model in relation to a total number of predictions made. An accuracy score is often calculated by dividing the number of correct predictions by the total number of predictions.

The insect sensor and/or the one or more image sensors may comprise one or more processing units. For example, the insect sensor may comprise one or more processing units configured to receive a sensor signal and to process the sensor signal so as to detect one or more insect detection events and to extract one or more attributes associated with each of the one or more detected insects, such as one or more insect signatures. Similarly, an image sensor may comprise one or more processing units configured to receive image data and to process the image data, for example to perform a pre-processing of the image data and/or to perform an image recognition process on the image data.

In other embodiments, some or all of the processing steps are performed by a data processing system external to the insect sensor and/or the one or more image sensors, or the processing steps may be distributed between a local processing unit of the insect sensor and/or of the one or more image sensors and a remote data processing system, separate from the sensors.

Here and in the following, the term processing unit is intended to comprise any circuit and/or device suitably adapted to perform the functions described herein. In particular, the term processing unit comprises a general- or special-purpose programmable microprocessor unit, such as a central processing unit (CPU) of a computer or of another data processing system, a digital signal processing unit (DSP), an application specific integrated circuits (ASIC), a programmable logic arrays (PLA), a field programmable gate array (FPGA), a special purpose electronic circuit, etc., or a combination thereof.

An image sensor may be configured to be in a standby mode in which the image sensor is not recording, transmitting, and/or storing images until the image sensor is activated by a trigger signal in response to an insect detection event being determined. The trigger signal may be sent by a processing unit, such as a processing unit comprised in the insect sensor, or by a data processing system, such as an external data processing system. This allows the system to be in a state, wherein an image sensor is not taking images continuously or wherein images taken by the image sensor are not kept as data. An image sensor, in particular a high-resolution image sensor, can create a large amount of data in a short time. By only obtaining the one or more images from the image sensor in response to an insect having been detected, the amount of data can be greatly reduced. After obtaining the one or more images of the one or more detected insects, the image sensor may re-enter the standby mode. Thus, in some embodiments, the method further comprises, prior to obtaining the one or more images from each of the one or more image sensors:

triggering the one or more image sensors in response to an insect detection event.

The insect detection system may be configured to time stamp sensor data, such as insect detection events, and/or to time stamp image data obtained by the one or more image sensors. This allows for sensor data indicative of at least one insect signature to be paired with the one or more images taken of one or more detected insects by grouping according to time stamps associated with the acquired sensor data and with the one or more digital images. For example, sensor data and digital images having a time stamp within a time interval may be grouped together. Alternatively or additionally, the insect detection system may associate the sensor data, such as one or more insect detection events, with one or more items of image data obtained by the one or more image sensors in a another manner, in particular one or more items of image data recorded by an image sensor responsive to said detected one or more insect detection events.

An image sensor may record, transmit, and/or store images continuously, while the insect detection system is active. As this may create large amounts of image data, it may be used with an insect detection system configured for time stamping and thereby reduce the amount of image data to be processed later, e.g. by only processing images time stamped to correlate with, or otherwise associate with, an insect detection event.

In some embodiments of the process, the process is capable of detecting individual insects and/or distinguish different types, e.g. different species, of insects. Embodiments of the method described herein can provide accurate classification and/or identification of insects which may have a number of uses. For example, accurate knowledge of the spatial variation of a particular type, e.g. species, of insect activity may help farmers with precision spraying, e.g. only spraying the areas with high activity, and also potentially help identify problem areas, or areas which consistently show early signs of infestation before others, or areas which are relatively more frequented by beneficial insects. In some embodiments, the insect detection system is further configured to determine a spray decision parameter based at least on the sensor data and on the one or more images.

In some embodiments, the detected insects are airborne insects moving above a ground surface. Examples of airborne insects include flying insects, jumping insects and insects that hover, glide or float in the air. Depending on the type of insect sensor and/or the type of insects to be detected, the ground surface may be the upper surface of the soil, an upper surface of a vegetation canopy or another reference surface. Some embodiments of the process described herein are particularly well suited for detection of airborne insects.

In some embodiments, the insect sensor is an optical insect sensor configured to optically detect one or more attributes associated with insect detection events in a probe volume of the insect sensor, in particular in a probe volume outside and in a proximity of the insect sensors. In particular, some embodiments of the insect sensor comprise an illumination module configured to illuminate the probe volume and one or more detectors configured to detect light from the probe volume, in particular light emitted, in particular reflected or backscattered, by the insects responsive to being illuminated by the illumination module. The detector module may thus output a sensor signal indicative of the detected light, e.g. indicative of a detected light intensity as a function of time. An optical insect sensor can be particularly useful for detecting insects, such as flying insect. In particular, the insect sensor is non-intrusive to the environment in the sense that it does not rely on and, consequently, is not biased by pheromones or other means of attracting, trapping or killing insects. In particular, insects may be detected in their natural environment regardless of their affinity to a certain lure or trap technology, thus reducing the sensitivity of the measurement results to different trapping techniques for different insect species. To this end, the probe volume is preferably an enclosure-free void/space allowing unrestricted movement of living airborne insects into and out of the void/space. Moreover, an optical insect sensor can be easily moved across a large target area and can perform measurements in relatively short measurement times.

Thus, in some embodiments, the probe volume of the insect sensor is realized by overlapping an expanded light source that illuminates a volume in front of the insect sensor within the field of view of a detector module, the detector module being configured to detect light from the probe volume. The shape of the probe volume may be a sheet. Thus, in some embodiments, the probe volume of the insect sensor is realized by overlapping a light sheet that illuminates the object plane of one or more of the one or more image sensors with the field of view of a detector module that covers the light sheet, the detector module being configured to detect light from the probe volume.

The insect sensor may comprise one or more processing units configured to receive a sensor signal from the detector module and to process the received sensor signal so as to detect one or more insect detection events and to extract one or more optically detectable attributes associated with the detected insect detection events. In other embodiments, some or all of the processing steps are performed by a data processing system external to the insect sensor, or the processing steps may be distributed between a local processing unit of the insect sensor and a remote data processing system, separate from the insect sensor.

In some embodiments, the illumination module comprises a light source that is configured to emit coherent or incoherent visible light and/or infrared and/or near-infrared light and/or light in one or more other wavelength bands. Infrared and/or near-infrared light (such as light in the wavelength band between 700 nm and 1500 nm, such as between 700 nm and 1000 nm) is not detectable by many insects, and thus does not influence the insect's behaviour.

In some embodiments, the illumination module includes a light source configured to emit incoherent light, in particular one or more light emitting diodes and/or one or more halogen lamps, thus providing a cost efficient sensor that may illuminate a relatively large probe volume so as to allow the sensor to simultaneously monitor a relatively large probe volume. Accordingly, the illumination module may be configured to simultaneously illuminate the entire probe volume. Further, incoherent light sources are useful to provide a homogeneous, speckle free, illumination of the probe volume, in particular a simultaneous illumination of a large probe volume without the need for any scanning operation. This reduces the complexity of the optical system and allows reliable detection of attributes even of fast-moving insects, such as one or a combination of more than one attributes chosen from the following: a wing beat frequency, a trajectory, a body-wing ratio, a relative or absolute total size, a relative or absolute body size, a relative or absolute wing size, a glossiness measure, a melanisation measure, etc. Nevertheless, other light sources, including coherent light sources, such as lasers, may be used instead. In some embodiments, the light source is configured to output light continuously while, in other embodiments, the light is turned on and off intermittently, e.g. pulsed. In some embodiments, the illumination module is configured to emit light with varying intensity, in particular pulsed or otherwise modulated at one or more modulation frequencies.

In some embodiments, the insect sensor is an electric field (E-field) sensor configured to acquire electric field data, such as a sensor configured to acquire data on electric field strength. The E-field sensor may comprise one or more electric field probes, and/or one or more radio antennas. Insects may modulate electric fields in their surroundings, such as modulate the amplitude of an electric field around them, e.g. of the Earth's static electric field. Such modulations may be measured by an electric field sensor. In some embodiments, the E-field sensor is configured to acquire modulated electric field data. In some embodiments, one or more E-field sensors are each configured to acquire frequency-modulated electric field data, wherein the frequency of the modulation is in the frequency range between 0.01 kHz and 22 kHz, such as between 0.01 kHz and 5 kHz, such as between 0.01 kHz and 2 kHz, such as between 0.01 kHz and 1 kHz. The E-field sensor may be configured to detect a near-field electric field modulation from an insect. In some embodiments, the insect sensor comprises two or more E-field sensors each configured to acquire data on electric field strength. An E-field sensor may be further configured for at least partly passive detection. Thus, the E-field sensor may be configured to receive, but not transmit signals during at least part of the sensors operating time. This may provide for an energy efficient sensor. The E-field sensor may be configured such that the probe volume is substantially cylindrical around a receiver of the sensor or the sensor may be configured such that the probe volume is substantially spherical around a receiver of the sensor. The radius of the extent of a probe volume that is substantially cylindrical or spherical may be in the range of 0.1 m to 10 m, such as in the range 0.15 to 5 m, such as 0.2 m to 3 m, such as 0.25 to 2 m, such as up to 20 m, or larger. In some embodiments, the insect sensor is comprised in an insect sensor system comprising an electric field generator configured to generate an electric field at a point or area of measurement of at least one E-field sensor in the insect sensor system. In some embodiments, the insect sensor system comprises an electric field generator configured to generate an electric field in a volume surrounding at least one E-field sensor. Thus, the electric field generator may be configured to generate and shape a probe volume, where there is no significant electric field present, e.g. indoors, or in addition to an existing probe volume, e.g. an existing electric field. The probe volume generated by the electric field generator may be cuboid, spherical, or cylindrical. The insect sensor system may advantageously be configured to provide an electric field probe volume that is an enclosure-free void/space allowing unrestricted movement of living airborne insects into and out of the void/space.

The insect signature is an attribute, which can be utilized in the classification of the detected insect. Examples of an insect signature is: a wing beat frequency, a trajectory, a body-wing ratio, a relative or absolute total size, a relative or absolute body size, a relative or absolute wing size, a glossiness measure, a melanisation measure, etc. The sensor data and the one or more digital images of the one or more detected insects may be used by an algorithm to classify, or even identify, the one or more detected insects. Such an algorithm may be created by a trained machine-learning model as disclosed herein.

In some embodiments, the method comprises classifying and/or identifying one or more types of insects, and/or determining respective amounts or numbers of the one or more types of insects detected in the probe volume. The classification and/or identification of respective types of insects may be based on one or more insect signatures chosen from:

- a signature feature extracted from the sensor signals and/or the one or more images by a trained machine-learning algorithm;
- a detected trajectory of movement of an insect inside the probe volume;
- a detected speed of movement of an insect inside the probe volume;
- one or more detected wing beat frequencies;
- a melanisation ratio;
- an insect glossiness;
- a body-wing ratio;
- a relative or absolute total size;
- relative or absolute body size;
- a relative or absolute wing size.

Thus, in some embodiments, the insect detection system is further configured to perform a classification and/or an identification of the detected insect based at least on the sensor data and/or on the one or more images.

Here, different types of insects may refer to different species or to other insect categories of a suitable taxonomy. Alternatively or additionally, different types of insects may refer to different life stages of insects and/or to other classifications. The identification of respective types of insect signatures based on one or more of the above and/or other insect signatures may be based on a look-up table, a decision tree, a neural network, a support vector machine, and/or the like. Alternatively or additionally, the identification may directly be based on the sensor signal, or on an otherwise pre-processed sensor signal, and/or on the one or more images of a detected insect. Such identification may e.g. be performed by an algorithm created by a trained machine-learning model, e.g. a model configured to receive a representation of the sensor signal and/or of the one or more images and to classify the received data into one of a known type of insects.

The machine-learning model is any suitable data driven classification model, such as a multivariate model. Alternatively, a statistical modelling may be used. Examples of suitable machine-learning models include a convolutional neural network. For example, in some embodiments, the sensor signal or a pre-processed sensor signal, and/or one or more images of the detected insect, may be fed into a neural network, such as a convolutional neural network, or another type of machine-learning model. The neural network may be a feed-forward neural network that includes an input layer receiving the sensor signal, e.g. a time series of detected light intensities at one or more wavelengths, and/or the one or more digital images. The neural network may optionally receive additional inputs, e.g. otherwise calculated signatures. The neural network may include one or more hidden layers and an output layer. The neural network may be trained, based on a dataset of training examples, to classify the sensor signal and/or the one or more images of a detected insect into respective types, e.g. species, of insects. To this end, the training examples may include sensor data as well as one or more images that have been obtained responsive to an insect detection event. The hidden layers of the trained neural network may represent automatically extracted features of the sensor data and images that are fed into the neural network. The output layer may represent a classification received sensor signal and/or images based on feature values of the automatically extracted features as extracted by the one or more hidden layers.

Thus, in some embodiments, the method further comprises creation of one or more training datasets for a machine-learning model by pairing acquired sensor data with the one or more images of each of the one or more detected insects. In some embodiments, the method comprises creation of one or more training datasets for a machine-learning model from the one or more classification datasets. In some embodiments, the method further comprises receiving, by a data processing system, the one or more training datasets, the data processing comprising a machine-learning model, and the method further comprises training of the machine-learning model using the training dataset to classify the insect into respective types, e.g. species, for example training of the machine-learning model to classify the insect based on the acquired sensor data. Training of the machine-learning model generates a trained machine-learning model that is trained to classify acquired sensor data into types of insect.

In some embodiments, the method further comprises classification and/or identification of the detected insect based at least on the sensor data and on the one or more images of the detected insect.

The present disclosure relates to different aspects including the method described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein are embodiments of an insect detection system for detection of insects, the insect detection system comprising:

- an insect sensor configured to acquire sensor data indicative of one or more insect detection events, each insect detection event being indicative of one or more detected insects in a probe volume of the insect sensor, the acquired sensor data being further indicative of at least one insect signature,
- an image sensor configured to obtain one or more digital images of the one or more detected insects in response to the one or more insect detection events.

According to another aspect, disclosed herein are embodiments of an insect detection system for detection of insects, the insect detection system comprising:

- an insect sensor configured to acquire sensor data indicative of one or more insect detection events, each insect detection event being indicative of one or more detected insects in a probe volume of the insect sensor, the acquired sensor data being further indicative of at least one insect signature, and one or more image sensors each configured to obtain one or more digital images of at least part of the probe volume of the insect sensor, wherein the insect detection system is configured to create one or more classification datasets by pairing the acquired sensor data with the one or more images from each of the one or more image sensors.

An insect signature is a measurable attribute, such as an optically detectable attribute, which can be utilized in the classification of the detected insect. Examples of an insect signature is: a wing beat frequency, a trajectory, a body-wing ratio, a relative or absolute total size, a relative or absolute body size, a relative or absolute wing size, a glossiness measure, a melanisation measure, etc.

The insect detection system thus provides both sensor data indicative of at least one insect signature, which can be utilized in the classification of the detected insect, and at least one digital image of the insect. Attaining both an image and an insect signature of the detected insect may have a number of uses, such as e.g. improving the prediction accuracy of classification and/or identification of an insect, or e.g. for training a machine-learning model to classify an insect.

The insect detection system may comprise a plurality of image sensors. Thus, in some embodiments, the insect detection system comprises two or more image sensors each configured to obtain one or more digital images of at least part of the probe volume of the insect sensor.

One or more insect signatures and one or more images associated with an insect detection event may be paired and e.g. made into training sets used to train a machine-learning model to classify an insect using only the one or more insect signatures. The classification and/or identification of the insect from the image may be done by an AI picture recognition system. A known way to obtain insect signatures is to use an insect sensor in an insectarium, also referred to as insectary, with predetermined species of insects. However, insects do not behave naturally in an insectary and in particular do not move naturally. The improved insect detection system allows for the datasets of sensor data and image data to be obtained in the natural habitat of the insects, such as e.g. in an agricultural field for growing crops, an area of forest or another geographic area, where the insects behave more normally. Thus, the datasets obtained using the insect detection system are superior for training of a machine-learning model to produce an algorithm that can be used to classify and/or identify insects in their natural habitat. Thus, in some embodiments, the insect detection system is further configured to create one or more training datasets for a machine-learning model by pairing acquired sensor data with the one or more images of each of the one or more detected insects. In some embodiments, the insect detection system is further configured to create one or more training datasets from the one or more classification datasets. In some embodiments, the insect detection system further comprises a data processing system, and wherein the data processing system comprises a machine-learning model that is configured to receive the one or more training datasets, the machine-learning model being configured to being trained to classify the acquired sensor data into respective types, e.g. species, of insect from the training dataset. Moreover, various embodiments of the method and system disclosed herein, allow large amounts of data, including data related to a large variety of different insect types, to be collected in any efficient manner, in particular without the need for capturing insects.

Further, acquiring sensor data that indicates both detection of an insect as well as an insect signature means that the method is simpler than if the detection and signature measurement were done by separate sensors.

In some embodiments, the image sensor captures one or more images of the detected insect. In some embodiments, the one or more image sensors captures one or more images of at least part of the probe volume. An image sensor may be comprised in a digital camera, such as a commercial digital camera. In some embodiments, the one or more image sensors are each configured to record in one or more ranges of electromagnetic radiation, such as within the visible spectrum, IR wavelengths, and/or UV wavelengths. An image sensor may be a high-resolution image sensor.

The one or more digital images may be one or more single images or a time sequence of images/video frames. The time sequence of images may be configured in a video format. The time sequence may be a high-speed video clip. In some embodiments, the insect detection system is configured to obtain the one or more digital images less than 250 milliseconds after the insect detection event, such as less than 100 milliseconds after the insect detection event, such as less than 50 milliseconds after the insect detection event, such as less than 10 milliseconds after the insect detection event. The faster the one or more image are captured after the insect detection event, the better the system allows for images to be obtained of faster insects, which might move out of the field of view of the camera if the delay between the insect detection event and the capturing of the one or more images is relatively large.

The one or more image sensor may be arranged such that they look at least part of the probe volume, i.e. such that each image sensor's field of view overlaps at least partly with the probe volume. Thus, in some embodiments, the image sensor is arranged such that the field of view of the image sensor overlaps with the probe volume, or such that it overlaps at least partly with the probe volume. The field of view of an image sensor may overlap with the probe volume from any angle.

In some embodiments, the insect detection system is further configured to trigger the one or more image sensors in response to an insect detection event. In some embodiments, the one or more image sensors are configured to comprise a standby mode. An image sensor may be configured to be in the standby mode until triggered, such as until triggered in response to an insect detection event. An image sensor may be triggered by a trigger signal. The trigger signal may be sent by a processing unit, such as a processing unit comprised in the insect sensor, or by the data processing system. In some embodiments, the insect detection system is configured to have an inherent latency delay between the identification of an insect detect event and the capturing of the one or more images of less than 10 milliseconds, such as less than 5 milliseconds, such as less than 1 milliseconds. The inherent latency delay is the minimum delay possible. The insect detection system may be configured such that there, at least in certain instances, is a larger delay than the inherent latency delay between the identification of an insect detect event and the capturing of the one or more images.

In some embodiments, the insect sensor is an optical insect sensor. The insect sensor may be configured to detect light from the probe volume, also sometimes known as a detection volume. An optical sensor may acquire sensor data within a probe volume extending outside the insect sensor device by detecting light from the probe volume. The insect sensor may be configured to output sensor data indicative of one or more optically detected attributes associated with respective detected insect detection events.

The insect sensor may be an insect sensor as disclosed in WO 2021/165479.

In some embodiments, the insect sensor comprises an illumination module configured to illuminate the probe volume, and one or more detectors configured to detect light from the probe volume. In some embodiments, the insect sensor comprises an illumination module configured to illuminate the probe volume with illumination light comprising light at a first wavelength band modulated at a first modulation frequency, and optionally light at a second wavelength band modulated at a second modulation frequency, different from the first modulation frequency, and a detector module comprising a detector configured to detect light from the probe volume.

The insect sensor may further comprise a processing unit configured to receive sensor signals from the detector module and to process the sensor signals for identification of one or more insect detection events. In some embodiments, the processing unit is configured to filter the received sensor signals to extract a first sensor signal modulated at the first modulation frequency. The processing unit may be configured to, based on at least the first sensor signal, detect at least one insect in the probe volume and, optionally, to determine at least one optically detectable attribute of the detected insect, such as a melanisation ratio and/or a direction of movement. Accordingly, the insect sensor provides accurate measurements while maintaining a low optical complexity of the insect sensor. Embodiments of the insect sensor may allow accurate measurements of spectral reflectivity at one, two or more wavelengths, largely unaffected by background illumination such as sunlight, while still allowing a high temporal fill factor in one, two or more channels.

The illumination module may be configured to illuminate the probe volume with illumination light and the detector module may be configured to detect a backscattered portion of the illumination light, the backscattered portion being backscattered by insects moving about the probe volume. In particular, the detector module may be configured to record a temporal profile of the reflected/backscattered light, as the temporal profile of the reflected/backscattered light is a fingerprint of the insect, which can be used to distinguish between different types of insects.

At least in some embodiments, the probe volume is a three-dimensional probe volume from which the insect sensor obtains sensor input suitable for the detection of insects. The probe volume may thus at least partly be defined by the field of view and depth of field of the detector module. In particular, the probe volume may be defined as an overlap of the volume illuminated by the illumination module and by a volume defined by the field of view and depth of field of the detector module. At least in some embodiments, the probe volume extends outside the insect sensor. In particular, the probe volume may be an enclosure-free void allowing unrestricted movement of living airborne insects into and out of the void. To this end, the probe volume may be defined solely by the overlap of the illumination volume and the field of view and depth of field of the detector module.

The probe volume may have a predetermined shape, size and position relative to the illumination module and/or relative to the detector module, e.g. relative to an aperture and/or an optical axis of the detector module. In particular, during the entire detection process, the probe volume may be stationary relative to the detector module and to the illumination module, i.e. the probe volume traverses the target area together with the insect sensor. The detector module may comprise one or more lenses that define an optical axis of the detector module and and/or that define a focal length. The focal length may be fixed during the entire detection process. Moreover, the optical axis may be fixed, during the entire detection process, e.g. relative to the illumination module and/or relative to a housing of the insect sensor. However, it will be appreciated that the insect sensor may allow the size, shape and/or relative position of the probe volume to be pre-configured and adapted to a specific measurement environment, e.g. by changing a relative position and/or orientation of the illumination module and the detector module. The detector module may further comprise an aperture.

In some embodiments, the probe volume is located in a proximity of the insect sensor. In particular, the probe volume may extend between a proximal end and a distal end of the probe volume, relative to the insect sensor, e.g. relative to an aperture or other optical input port of the detector module. In some embodiments, the distal end may be no more than 5 m from the insect sensor, such as no more than 4 m, such as no more than 3 m. The proximal end may be separated from the insect sensor, e.g. from an aperture or other optical input port of the detector module, by 1 cm or more, such as by 10 cm or more, such as by 20 cm or more, such as by 30 cm or more.

The probe volume may have a variety of shapes and sizes, such as box-shaped, cylindrical, ball-shaped, cone-shaped, pyramidal, frusto-conical, frusto-pyramidal, etc. In some embodiments, the probe volume has a size of at least 5 l, such as at least 10 l, such as at least 20 l, such as at least 0.1 $m^3$, such as at least 0.2 $m^3$, such as at least 0.5 $m^3$, such as at least 1 $m^3$, such as at least 2 $m^3$, such as at least 3 $m^3$. Even when the insect sensor has a relatively small probe volume, e.g. less than 1 l, a movable sensor unit may be deployed, or the insect sensor and one or more image sensor may be mounted on a movable entity such as a vehicle, so as to allow the insect detection system to acquire sensor data and digital images in a larger geographic area.

In some embodiments, the probe volume has a size of less than 20 $m^3$, such as less than 10 $m^3$, such as at less than 5 $m^3$, such as less than 1 $m^3$, such as less than 100 l, thereby facilitating uniform illumination at high brightness of the entire probe volume while allowing for reliable detection of insects and/or attributes associated with the detected insects, e.g. one or more of the following attributes of insects: trajectories, wing beat frequencies, glossiness, melanisation, body-wing ratio, relative or absolute total size, relative or absolute body size, relative or absolute wing size.

In some embodiments, the probe volume has an aspect ratio, e.g. defined as a ratio of a largest edge to a smallest edge of a minimum bounding box of the probe volume. In some embodiments, the aspect ratio is no larger than 10:1, such as no larger than 5:1, such as no larger than 3:1, such as no larger than 2:1. For example, the aspect ratio may be between 1:1 and 10:1, such as between 1:1 and 5:1, such as between 1:1 and 3:1, such as between 2:1 and 3:1. A low aspect ratio of the probe volume allows moving insects to be tracked over a relative long period of time, regardless of the direction of travel of the insects, thus allowing more accurate detection of different insects, e.g. flying or jumping insects, insects moving at different speeds, etc. Moreover, a relatively long observation time also increases the accuracy of the determined optically detectable attributes such as wing beat frequency, etc. The minimum bounding box may have a vertical and two horizontal edges. The vertical edge may be the smallest edge of the minimum bounding box. For example, a ratio between each of the horizontal edges and the vertical edge may be between 2:1 and 10:1, such as between 2:1 and 5:1, such as between 2:1 and 3:1.

Some embodiments of the insect sensor described herein allow for detection of insects moving within the probe volume during sufficiently long observation times so as to reliably identify and distinguish different optically detectable attributes, e.g. wing beat frequencies and/or a trajectories and/or body wing ratios and/or melanisation ratios and/or glossiness and/or relative or absolute total size and/or relative or absolute body size and/or relative or absolute wing size. Such techniques have been found to be useful in achieving reliable detection and/or classification of individual insects. Thus, some embodiments of the insect sensor provide a sensor signal having a quantitative characteristic, such as e.g. observation time or use of multiple frequencies, which makes the sensor data particularly suitable for classification and/or identification of insect. This further makes it advantageous to combine such sensor data with one or more image sensors. Thus, the quality of the sensor data warrants the taking of one or more images of an insect detected by the insect sensor.

The insect sensor and/or the one or more image sensors may comprise a housing or both be comprised in a housing. The insect detection system may comprise a sensor unit, where the sensor unit comprises at least the insect sensor and the one or more image sensors. The sensor unit may be housed within the housing. In some embodiments, the sensor unit is mounted on a movable entity comprising a propulsion mechanism, or the sensor unit is configured to be mountable on a movable entity. The sensor unit may be mounted on a transportation part, such as a transportation part that holds both the insect sensor and the one or more image sensors, where the transportation part comprises a propulsion mechanism, e.g. a motor and wheels, belts, a propeller, or other type propulsion system. The sensor unit may thus be self-propelled. Alternatively, the insect sensor and one or more image sensors may be mountable together on a vehicle, such as a tractor, a spraying beam, or other agricultural vehicle, on an unmanned aerial vehicle, a self-driving robot, or the like. The insect sensor and one or more image sensors may be part of, or be mountable on, a ground vehicle or an aerial vehicle. The insect sensor and one or more image sensors may be part of, or be mountable on, an autonomous vehicle or an operator-controlled vehicle, such as a remote controlled vehicle or a manned vehicle. In some embodiments, the sensor unit and/or the support structure is/are configured such that the probe volume extends from a top of a vegetation canopy upwards. Accordingly, interference of the vegetation with the insect sensor, e.g. by blocking the light path, is thus avoided or at least reduced. To this end, the minimum vertical offset may be predetermined, e.g. configurable prior to use. To this end, the support structure may be adjustable so as to adjust a mounting height of the insect sensor, so as to adapt the minimum vertical offset to the vegetation in vicinity of the insect sensor. For example, the insect sensor may be mounted such that the vertical offset of the insect sensor above the ground surface is adjustable and/or such that the orientation of the insect sensor relative to the ground surface is adjustable. The size of the vertical offset may depend on factors such as the type, height and/or density of the vegetation growing in the area of land where the insect sensor is deployed and/or the type of insects to be detected. For example, the minimum vertical offset may be chosen between 10 cm and 5 m, such as between 20 cm and 3 m, such as between 20 cm and 2 m, such as between 50 cm and 2 m.

According to another aspect, disclosed herein are embodiments of an insect detection system for detection of insects, the insect detection system comprising:

an optical insect sensor configured to acquire sensor data indicative of one or more insect detection events, each insect detection event being indicative of one or more detected insects in a probe volume of the optical insect sensor, the optical insect sensor comprising an illumination module configured to illuminate the probe volume and at least one detector configured to detect light from the probe volume, the illumination module being configured to create at least one light sheet, one or more image sensors each configured to obtain one or more digital images of at least part of the probe volume of the optical insect sensor, wherein the optical insect sensor and one or more of the one or more image sensors are arranged such that the light sheet illuminates the object plane of the image sensor, wherein the probe volume of the insect sensor is realized by the light sheet overlapping with the field of view of the at least one detector, and wherein the insect detection system is configured to create one or more classification datasets by pairing the acquired sensor data with the one or more images from each of the one or more image sensors.

According to another aspect, disclosed herein are embodiments of an insect detection system for detection of insects, the insect detection system comprising:

an optical insect sensor configured to acquire sensor data indicative of one or more insect detection events, each insect detection event being indicative of one or more detected insects in a probe volume of the optical insect sensor, the optical insect sensor comprising an illumination module configured to illuminate the probe volume and at least one detector configured to detect light from the probe volume, the illumination module being configured to create at least one light sheet, an image sensor configured to obtain one or more digital images of the one or more detected insects in response to the one or more insect detection events, wherein the optical insect sensor and the image sensor are arranged such that the light sheet illuminates the object plane of the image sensor, and wherein the probe volume of the insect sensor is realized by the light sheet overlapping with the field of view of the at least one detector.

One or more of the one or more image sensors and the at least one detector are thus arranged in accordance with the Scheimpflug principle.

The light sheet is a sheet of light, which when seen from the side is effectively a collimated beam and when seen from above shows a divergent light. Thus, the light sheet may be shaped as a fan. Thus, the probe volume may extend much further in a first and a second direction, which are orthogonal to each other, than in a third direction, which is orthogonal to the first and second direction. A light sheet plane is defined by the first and second direction.

Using a probe volume, which extends much further in two orthogonal directions than in a third orthogonal direction, such as a substantially 2D probe volume, overlapping with the object plane of an image sensor allows for higher quality of the one or more images obtained by the image sensor compared to many other configurations, such as when using a 3D probe volume, as the system can be arranged such that it is more likely that the detected insect is in focus when the one or more images are obtained.

There are a number of advantages to this configuration. For example, the field of view of the image sensor can be chosen to be smaller, because of the increased certainty that the insect will be caught on the one or more images. In particular, the field of view of an image sensor may be arranged in accordance with the Scheimpflug principle. Thus, the image sensor may be smaller, which can make the insect detection system cheaper. For the same reason, the resolution of the image sensor may be decreased. Thus, it may be possible to use a cheaper image sensor, e.g. an image sensor with a lower resolution, which makes the system cheaper. In the advantageous configuration allowing for higher quality images it may be possible to obtain images of high enough detail of the detected insects that a classification of the detected insects can be made based on the image(s) alone, i.e. without any insect signature. Moreover, having one or more essentially 2D probe volumes than a 3D probe volume makes the system overall simpler. Further, since the light is partially collimated, it may be possible to use a lower intensity light source thus making the system less power consuming.

In some embodiments, the height of a single light sheet is less than 10 cm, such as less than 5 cm, such as less than 4 cm, such as less than 3 cm, such as less than 2 cm.

In some embodiments, the light sheet divergence is 45-120 degrees in one spatial dimension and less than 5 degrees in the other spatial dimension.

In some embodiments, the light sheet is made up of 1-10 infrared lasers or LEDs.

When an insect flies through the sheet, light is reflected off the insect and picked up by the one or more detectors. The one or more detectors may then in turn send a trigger signal to the one or more image sensors to record the insect. In some embodiments, one or more of the image sensor(s) comprises an emitter, which acts as a flash, to illuminate the insect when the event is recorded. In some embodiments, an emitter comprised in an illumination module of the optical sensor may be used as a flash to illuminate a detected insect. An emitter used as flash may be monochrome or IR in which case the images obtained will not be in colour. When it is required that the one or more images be in colour, daylight or a flash producing suitable light in the visible spectrum is required.

In some embodiments, the illumination module is configured to create two or more light sheets. This will create two or more probe volumes, one for each light sheet. The depth of field of an image sensor may be thin, which means that in the time delay between the breaking of the light sheet by the insect and the recording of one or more images by the image sensor, the insect may have moved away from the focus volume. With two or more light sheets, there is time for the insect to fly to the volume, where it will be in focus when the one or more images are recorded. For example, two light sheets may be placed on either side of the depth of field of an image sensor (or even with some distance from the outer borders of the depth of field).

In some embodiments, two or more light sheets may be arranged so as to be at an angle with respect to each of the other light sheet(s). For example, in some embodiments, two light sheets may be arranged such that their planes are at an angle of less than 45 degrees to each other, such as at an angle of less than 60 degrees to each other, such as at an angle of less than 90 degrees to each other. In some embodiments, two or more light sheets may be arranged such that their planes are essentially parallel or orthogonal to each other. In some embodiments, the light sheets are arranged such that light from one sheet does not overlap with light from another sheet.

In some embodiments, the insect detection sensor will be configured to have two or more light sheets, and each light sheet will have at least one image sensor arranged relative to it in accordance with the Scheimpflug principle.

According to another aspect, disclosed herein are embodiments of a data processing system configured to perform steps of the method described herein. In particular, the data processing system may have stored thereon program code adapted to cause, when executed by the data processing system, the data processing system to perform the steps of the method described herein. The data processing system may be embodied as a single computer or as a distributed system including multiple computers, e.g. a client-server system, a cloud based system, etc. The data processing system may include a data storage device for storing the computer program and sensor data. The data processing system may directly or indirectly be communicatively coupled to the sensor unit and receive the sensor data and image data from the sensor unit. To this end, the data processing system may comprise a suitable wired or wireless communications interface.

According to another aspect, a computer program comprises program code adapted to cause, when executed by a data processing system, the data processing system to perform the steps of the method described herein. The computer program may be embodied as a computer-readable medium, such as a CD-ROM, DVD, optical disc, memory card, flash memory, magnetic storage device, floppy disk, hard disk, etc. having stored thereon the computer program. According to one aspect, a computer-readable medium has stored thereon a computer program as described herein.

Additional aspects, embodiments, features and advantages will be made apparent from the following detailed description of embodiments and with reference to the accompanying drawings.

BRIEF DESCRIPTION OF THE DRAWINGS

Preferred embodiments will be described in more detail in connection with the appended drawings, where.

DETAILED DESCRIPTION

Figure 1:
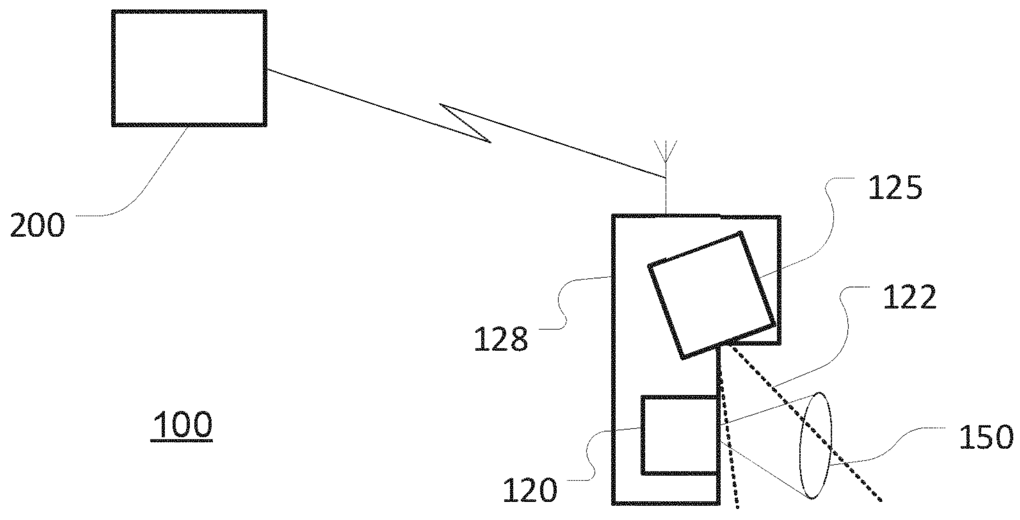
FIG. 1 shows a schematic view of an insect detection system according to some embodiments, FIG. 2 schematically illustrates a data processing system according to some embodiments.

FIG. 1 shows a schematic view of an insect detection system for detection of insects. The insect detection system, generally designated by reference numeral 100, comprises an insect sensor 120, an image sensor 125, and a data processing system 200. The insect sensor 120 and image sensor 125 are positioned relative to each other in such a way that the image sensor 125 can take one or more images of at least part of the probe volume of the insect sensor. The image sensor 125 may take one or more images of an insect detected by the insect sensor 120. The insect sensor 120 and the image sensor 125 are comprised within a sensor unit 128.

The insect sensor may be an optical insect sensor, examples of which are described in greater detail with reference to FIGS. 4 and 5 below. An optical insect sensor device may comprise an illumination module including a light source, such as one or more halogen lamps, one or more LEDs or the like, configured to illuminate a volume in a proximity of the insect sensor device. The insect sensor device may further comprise a detector module including one or more detectors and one or more optical elements configured to capture backscattered light from at least a portion of the illuminated volume and to guide the captured light onto the one or more detectors. The illuminated volume from which light is captured by the detector module for detecting insects is referred to as probe volume 150.

Generally, the probe volume 150 may be defined as the volume from which the detector module obtains light signals useful for detecting insects. The probe volume is typically defined by an overlap of the volume illuminated by the illumination module and by the field of view and depth of field of the detector module. In particular, the probe volume is not limited by any physical enclosure but is an open, unenclosed void or space in which airborne, living insects may enter or exit in an unrestricted manner.

The probe volume is also the volume from which the insect sensor acquires measurements useful for detecting insects. Generally, the insect sensor 120 acquires sensor data from which insect detection events can be detected. An insect detection event refers to the detection of one or more insects being present in the probe volume 150. Detection of an insect detection event may be based on one or more criteria, e.g. based on a signal level of the detected sensor signal and/or on another property of the sensor signals sensed by the detector module of the insect sensor, e.g. in response to the received light from the probe volume.

The optical insect sensor uses reflected/backscattered light from insects in the probe volume 150 to detect insects and to measure optically detectable attributes of the detected insects, e.g. one or more of the following: one or more wing beat frequencies, a body-to-wing ratio, a melanisation ratio (colour), a detected trajectory of movement of an insect inside the detection volume, a detected speed of movement of an insect inside the detection volume, an insect glossiness, or the like.

The image sensor 125 is arranged such that the field of view 122 of the image sensor overlaps at least partly with the probe volume 150. When not actively taking images of a detected insect, the image sensor 125 is in a standby mode. As an insect detection event is determined, a trigger signal may be sent to the image sensor 125, which may then take one or more images of the detected insect. The image sensor 125 is shown as looking "down" on the probe volume, but in other embodiments the image sensor may be looking at the probe volume 150 from another direction. After taking one or more images, the image sensor may again enter a standby mode.

The data processing system 200 is configured, e.g. by a suitable computer program, to receive sensor data from the insect sensor 120 and image data from the image sensor 125. The data processing system 200 may be a stand-alone computer or a system of multiple computers, e.g. a client-server system, a cloud-based system or the like. An example of a data processing system will be described in more detail below with reference to FIG. 2.

The data processing system 200 may be configured to process the received sensor data and image data to create training datasets for a machine-learning model from classification datasets created by pairing acquired sensor data with the one or more images of each of the one or more detected insects. Further, the data processing system 200 may comprise a machine-learning model that is configured to receive a training dataset being configured to being trained to classify the acquired sensor data into respective types, e.g. species, of insects based on the training dataset of acquired sensor data and one or more images of a detected insect. Alternatively, or additionally, the data processing system 200 may be configured to run a classification algorithm using the sensor data and image data as input, so as to arrive at a type, e.g. species, of the insect detected.

The insect sensor 120 and/or the image sensor 125 is communicatively coupled to the data processing system 200 and can communicate acquired sensor data and/or image data to the data processing system 200. To this end, the sensor unit 128 may include a suitable communications interface. The communications interface may be a wired or a wireless interface configured for direct or indirect communication of data, such as sensor data and image data, to the data processing system. In the example of FIG. 1, the sensor unit 128 communicates the collected data via a cellular telecommunications network to the data processing system 200, e.g. via a GSM/GPRS network, USTM network, EDGE network, 4G network, 5G network or another suitable telecommunications network. In some embodiments, the communications interface may be configured for communication via satellite. It will be appreciated that the communication may be a direct communication or via one or more intermediate nodes, e.g. via a movable support, see e.g. description of FIG. 3. Similarly, the communication may use alternative or additional communications technologies, e.g. other types of wireless communication and/or wired communication. Yet further, the collected data may be stored locally by the sensor unit or by a movable support for subsequent retrieval from the sensor unit, e.g. after traversing a geographic area. To this end, the sensor unit or a movable support may include a local data storage device for logging the data and for allowing the stored data to be retrievable via a data port or a removable data storage device.

It will be appreciated that the data acquisition is performed locally in the sensor unit 128. The remaining signal and data processing tasks may be distributed between the sensor unit and the data processing system 200 in a variety of ways. For example, some or even all signal and/or data processing may be performed locally in the sensor unit. Similarly, some or even all signal and/or data processing tasks may be performed by the data processing system. For example, the identification of insect detection events from the sensor signals may be performed locally by the insect sensor while other information derived from sensor data may be performed by the data processing system. Alternatively, the insect sensor may forward the sensor signals to the data processing system, which then performs the identification of insect detection events. Similarly, pre-processing of the obtained images may be performed locally by the image sensor. Accordingly, depending on the distribution of processing tasks between the insect detections system and the data processing system, the sensor data communicated from the sensor unit to the data processing system may have different forms, e.g. raw or pre-processed sensor signals and/or images, event data indicative of identified insect detection events, detected attributes associated with the insect detection events, etc.

Figure 2:
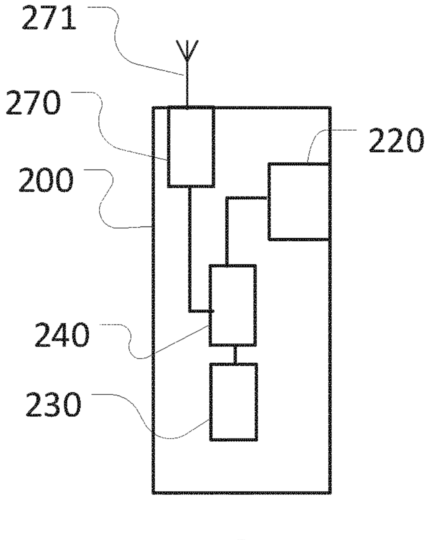

FIG. 2 shows a schematic view of an example of a data processing system. The data processing system 200 comprises a central processing unit 240 or other suitable processing unit. The data processing system further comprises a data storage device 230 for storing program code, received sensor data, images and/or created insect distribution maps, etc. Examples of suitable data storage devices include a hard disk, an EPROM, etc. The data processing system further comprises a data communications interface 270, e.g. a network adaptor, a GSM module or another suitable circuit for communicating via a cellular communications network or via another wireless communications technology. To this end, the data processing system may further comprise an antenna 271. It will be appreciated that the data processing system may include a wired data communications interface instead of or in addition to a wireless communication interface. The data processing system may receive sensor data and/or image data from the sensor unit via one or more nodes of a communications network. The data processing system further comprises an output interface 220 e.g. a display, a data output port, or the like.

Figure 3:
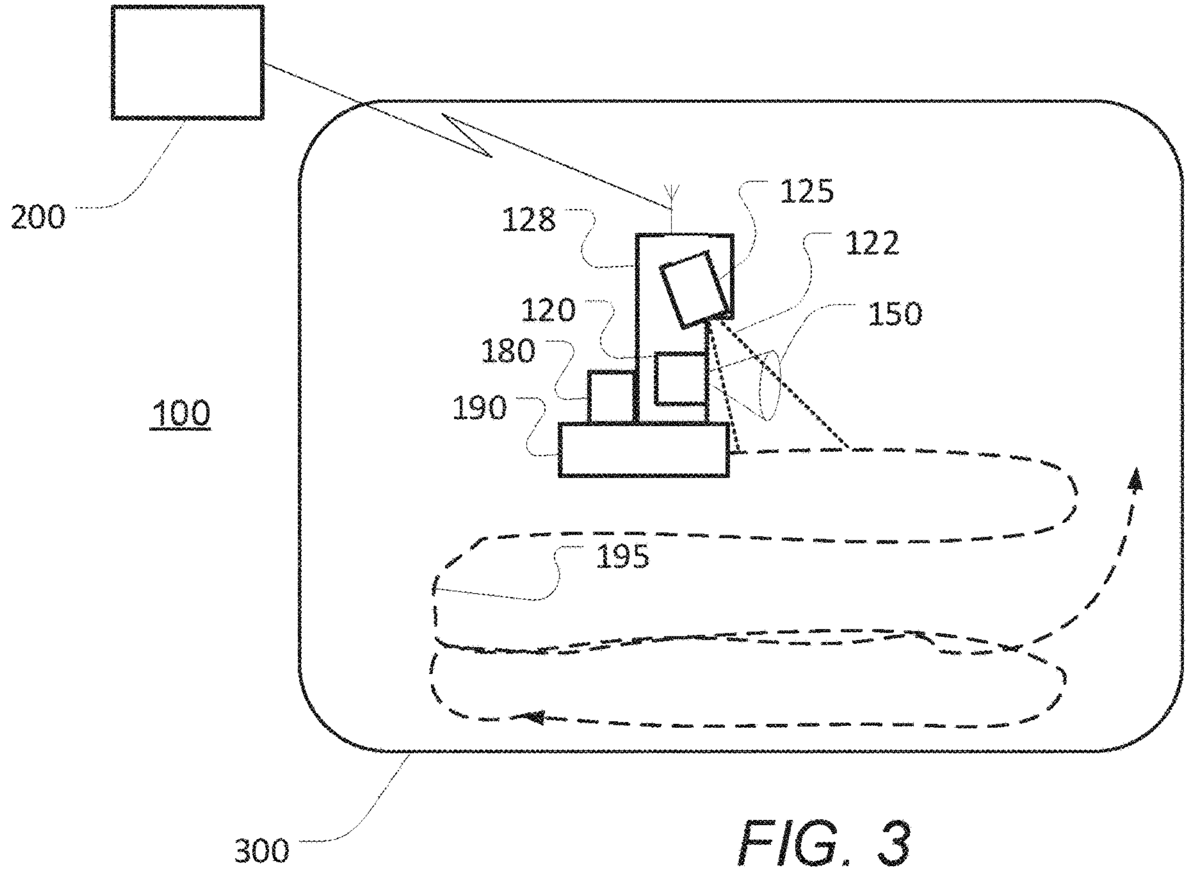
FIG. 3 shows a schematic view of a movable insect detection system according to some embodiments, FIGS. 4 and 5 schematically illustrate an insect sensor according to some embodiments, FIG. 6 schematically illustrates an example of sensor signals from a detector module of some embodiments of an insect sensor.

FIG. 3 shows a schematic view of a movable sensor unit for detection of insects. The insect detection system is similar to the insect detection system shown in FIG. 1 and for the most part only those features that separate the embodiments of FIGS. 1 and 3 are mentioned in the following.

The sensor unit 128 is configured to traverse a geographic target area 300. To this end, the movable sensor unit may be integrated into or mounted to a movable support 190, e.g. on a vehicle such as a tractor, a movable farming machine, a spraying beam etc. It will be appreciated that alternative embodiments may include multiple sensors on a movable support 190. For example, a moving platform or vehicle may have multiple sensors mounted on it, which may be considered together or separately.

The insect sensor 120 detects insects in a probe volume 150 in a proximity of the insect sensor. Accordingly, as the movable sensor unit moves and traverses an area, the probe volume also moves and traverses the area. Generally, the probe volume may be defined as the volume from which the insect sensor acquires measurements useful for detecting insects.

The area 300 may be an agricultural field for growing crops, an area of forest or another geographic area. A relevant area for a movable sensor unit is typically much larger than the horizontal extent of the probe volume, such as at least 10 times larger, at least 100 times larger, such as at least 1000 times larger. The movable sensor unit may traverse at least a portion of the area along a trajectory 195.

In the example of FIG. 3, the sensor unit 128 or the movable support 190 comprises a position sensor 180, e.g. a GPS sensor, for tracking the position of the sensor unit while traversing a target area. Accordingly, the sensor unit or the movable support may record its position at respective times, e.g. at regular time intervals, e.g. so as obtain a sequence of time-stamped position coordinates. The sensor unit or the movable support may further store time-stamped operational data, e.g. whether the sensor unit is acquiring data, such as sensor signals or images, one or more quality indicators of the acquired data, etc., so as to allow a determination of the actual time during which the sensor unit acquires usable data in respective portions of the target area.

The data processing system 200 is further configured to receive position data from the position sensor 180. The data processing system 200 is configured to process the received sensor data, image data, and the received position data. For example to create an insect distribution map.

Figure 4:
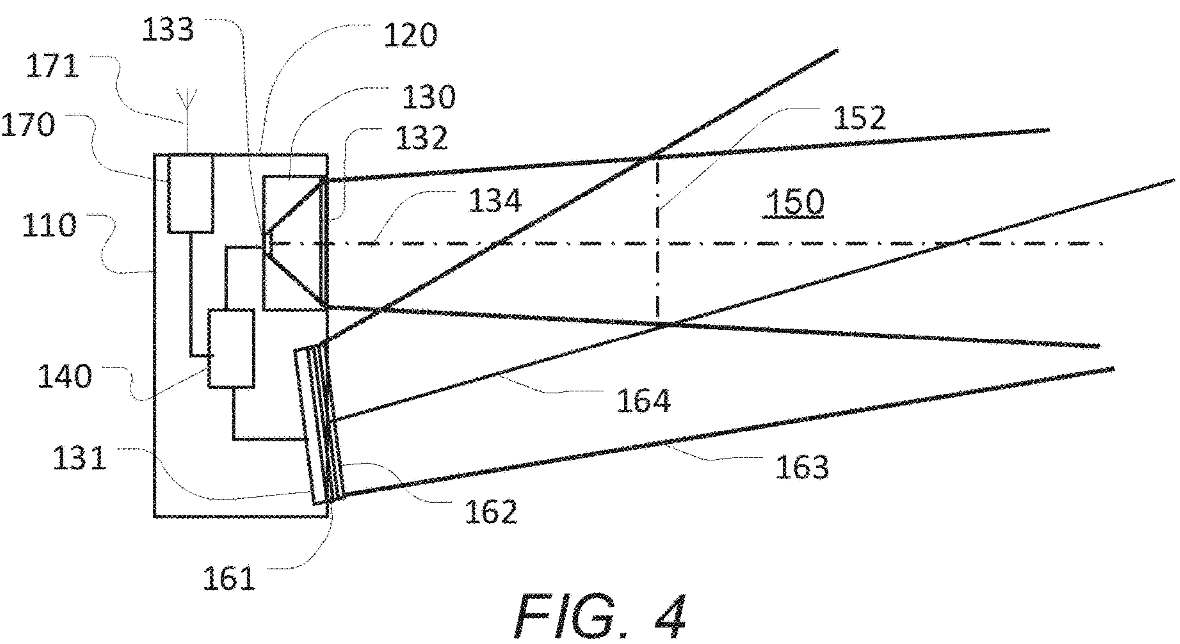

FIG. 4 schematically illustrates an embodiment of an insect sensor. The insect sensor, generally designated by reference numeral 120, comprises a processing unit 140, a detector module 130 and an illumination module 131, all accommodated within a housing 110. In this example, the illumination module and the detector module are vertically aligned with each other and the illumination module is arranged below the detector module. However, other arrangements are possible as well.

Generally, in order to maximize the amount of backscattered light from insects inside the probe volume 150, it may be preferable to position the illumination module adjacent or otherwise close to the detector module, such that the illumination direction and the viewing direction only define a relatively small angle between them, e.g. less than 30°, such as less than 20°. In some embodiments, the illumination module is configured to emit a beam of light along an illumination direction, and the detector module defines a viewing direction, e.g. as an optical axis of the detector module, wherein the illumination direction and the viewing direction define an angle between each other, the angle being between 1° and 30°, such as between 5° and 20°.

The illumination module comprises an array of light-emitting diodes (LEDs) 161 and a corresponding array of lenses 162 for directing the light from the respective LEDs as a diverging beam 163 along an illumination direction 164. The array of light emitting diodes may comprise a first set of diodes configured to selectively emit light at a first wavelength band, e.g. at 808 nm+/−25 nm. The array of light emitting diodes may further comprise a second set of diodes configured to selectively emit light at a second wavelength band, different from the first wavelength band, in particular spaced-apart from the first wavelength band, e.g. at 970 nm+/−25 nm. In other embodiments, the array of light emitting diodes may include alternative or additional types of LEDs or only a single type of LEDs. For example, in some embodiments, the LEDs may be configured to emit broad-band visible, near-infrared and/or infrared light.

The detector module 130 comprises an optical system 132 in the form of a Fresnel lens. Alternative another lens system may be used, e.g. an NIR coated aspheric lens, e.g. having 60 mm focal length and an ø 76.2 mm aperture. The detector module 130 includes an optical sensor 133, e.g. one or more photodiodes, such as an array of photodiodes, a CCD or CMOS sensor and the optical system directs light from the probe volume onto the optical sensor. In some embodiments, the optical system images an object plane 152 inside the illuminated volume onto the optical sensor. The field of view of the optical system and the depth of field of the optical system are configured such that the optical system directs light from a portion of the volume illuminated by the illumination module onto the optical sensor. The portion of the illuminated volume from which the optical system receives light such that it can be detected by the optical sensor and used for detection of insects defines a probe volume 150. The optical system 132 defines an optical axis 134 that intersects with the illumination direction 164, preferably at a small angle, such as 10°.

For example, when an optical system is based on a camera lens having f=24 mm, f/2.8 and an optical sensor includes a ¾" image sensor, the detector module may be configured to focus on an object plane at 2 m distance from the lens, corresponding to a field of view of approximately 1.7 m×1.7 m and a depth of field of approximately 1.3 m, thus resulting in a probe volume of approx. 3.7 $m^3$.

The detector module 130 is communicatively coupled to the processing unit 140 and forwards a sensor signal indicative of the captured radiation by the optical sensor 133 to the processing unit. The processing unit 140 may include a suitably programmed computer or another suitable processing device or system. The processing unit receives the sensor signal, e.g. an image or stream of images and/or one or more sensed light intensities from respective one or more photodiodes and, optionally, further sensor signals from the detector module. The processing unit 140 processes the received sensor signals so as to detect and classify and/or identify insects in the probe volume and output sensor data indicative of detected insect detection events and associated optically detectable attributes.

Figure 5:
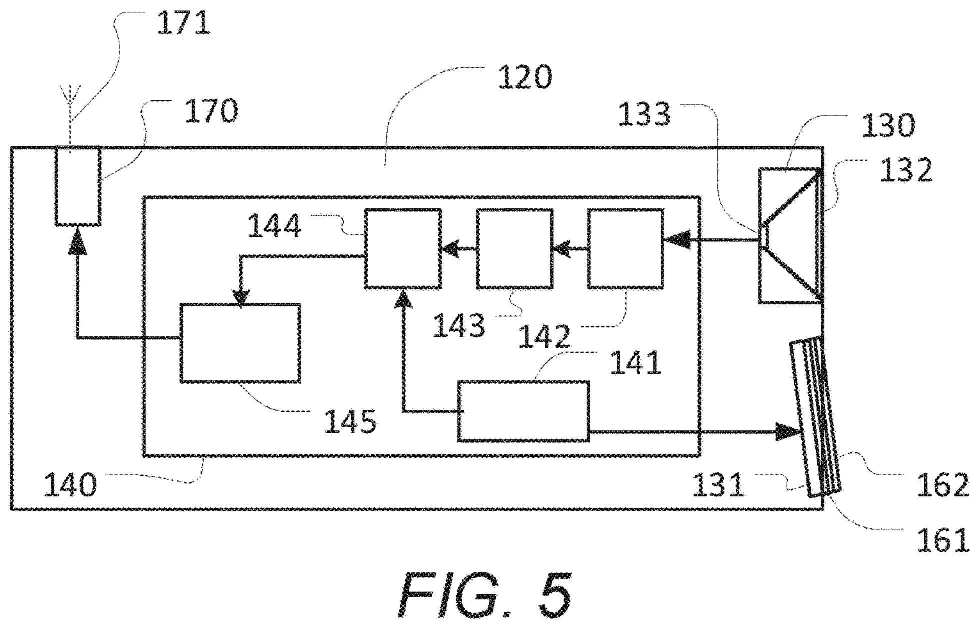

FIG. 5 schematically illustrates a more detailed view of an example of an insect sensor. The insect sensor 120 of FIG. 5 is similar to the insect sensor of FIG. 4 and comprises a processing unit 140, a detector module 130 and an illumination module 131, all accommodated within a housing 110 and all as described in connection with FIG. 4. In this example, the illumination module 131 includes an array of light emitting diodes (LEDs). The LEDs may be arranged in a 2D pattern, such as on a regular 2D grid. The LEDs may be distributed over an area of at least 10 $cm^2$, such as at least 30 $cm^2$, such as at least 60 $cm^2$, such as at least 80 $cm^2$. In some embodiments, the LEDs may be distributed over an area between 10 $cm^2$ and 400 $cm^2$, such as between 30 $cm^2$ and 300 $cm^2$, such as between 40 $cm^2$ and 200 $cm^2$, such as between 60 $cm^2$ and 120 $cm^2$, e.g. about 90 $cm^2$. Accordingly, an illumination beam having a large cross-sectional area may be emitted so as to illuminate a large volume simultaneously. The light emitted from each diode may be partially collimated by an asymmetrical lens to form a diverging beam, e.g. expanded with 40° and 8° diverging angles in the vertical and horizontal axis, respectively (measured as full divergence angles). The array of LEDs may all emit the same wavelength band or be arranged in such a way as to mix multiple wavelengths. In one example, the illumination module emits light at two different narrow wavelength bands, i.e. a first band at a first wavelength and a second band at a second wavelength, such as at 808 nm and 970 nm, respectively. Other embodiments may include a single type of LEDs or more than two different types of LEDs. The light from the illumination module is modulated at one or at multiple respective frequencies, e.g. the light at each wavelength may be encoded with a unique frequency. In one example, the light at the first wavelength is modulated at a first modulation frequency and the light at a second wavelength is modulated at a second modulation frequency, different from the first modulation frequency. The first and second modulation frequencies may each be selected between 10 kHz and 500 kHz, such as between 50 kHz and 200 kHz. In one example, the first modulation frequency is about 80 kHz and the second modulation frequency is about 120 kHz. To this end, the processing unit includes a synchronization circuit 141 having a clock for controlling the illumination module.

The detector module 131 includes a sensor 133 including a 2×2 array of light-sensitive elements, such as photodiodes. In one particular embodiment, the detector sensor 133 is a quadrant detector with four individual Si photodiodes arranged in a square. It will be appreciated that other embodiments may include a larger array of light-sensitive elements or a smaller array or light sensitive elements, such as a 2×1 array, or even a single light sensitive element. The optical system 132 is arranged relative to the photodiode sensor array in such a way as to image an image plane within the probe volume onto the photodiode array. The four light-sensitive areas thus collect light from four substantially separate sub-volumes of the probe volume.

The detected signals from the photodiode array 133 are fed into the processing unit 140. The processing unit includes an amplifier bank 142 with a number of amplifiers matching the size of the photodiode array. In this example, the amplifier bank includes four transimpedance amplifiers. The amplified signals are fed into a corresponding A/D converter bank 143, which includes a number of A/D converters corresponding to the size of the photodiode array, such as four A/D converters. The A/D converter bank 143 generates respective digital time-resolved signals for the individual photodiodes. The processing unit further comprises a de-multiplexer circuit 144, e.g. an FPGA implementing a number of digital lock-in amplifiers corresponding to the size of the photodiode array and to the number of wavelengths. In one example, the de-multiplexer circuit implements eight lock-in amplifiers corresponding to the four quadrants of the quadrant detector and two individually modulated wavelengths. The de-multiplexer circuit 144 de-multiplexes the signals from each of the photodiodes into separate signals, optionally into separate signals for the respective wavelengths, i.e. for each photodiode, the de-multiplexer circuit generates one signal for each individually modulated wavelength. To this end, the de-multiplexing circuit receives a clock signal from the synchronisation circuit 141. The lock-in amplifiers further serve as an efficient filter for light not modulated with frequencies around the two lock-in frequencies.

The resulting de-multiplexed signals thus include one or more, e.g. two, wavelength-specific channels for each photodiode, e.g. 2×4 channels. It will be appreciated that, in embodiments with a different number of wavelengths or a different array size, the number of de-multiplexed signals will generally be different. The de-multiplexed signals are forwarded to a data processing circuit 145, which processes the individual signals to detect insects being present in the probe volume, i.e. to detect insect detection events, and to determine one or more attributes of each detected insect. To this end, the data processing circuit 145 may initially perform a calibration of the signal, e.g. based on stored calibration data, such as stored offsets and/or multiplicative factors. The data processing circuit outputs sensor data indicative of the insect detection events and the associated determined attributes. The data processing circuit may further log sensor data associated with multiple insect detection events. The data processing circuit may intermittently, e.g. periodically, upon request, or when the internal log buffer is about to be full, communicate the recorded sensor data via the communications interface 170 to a remote data processing system as described herein.

Figure 6:
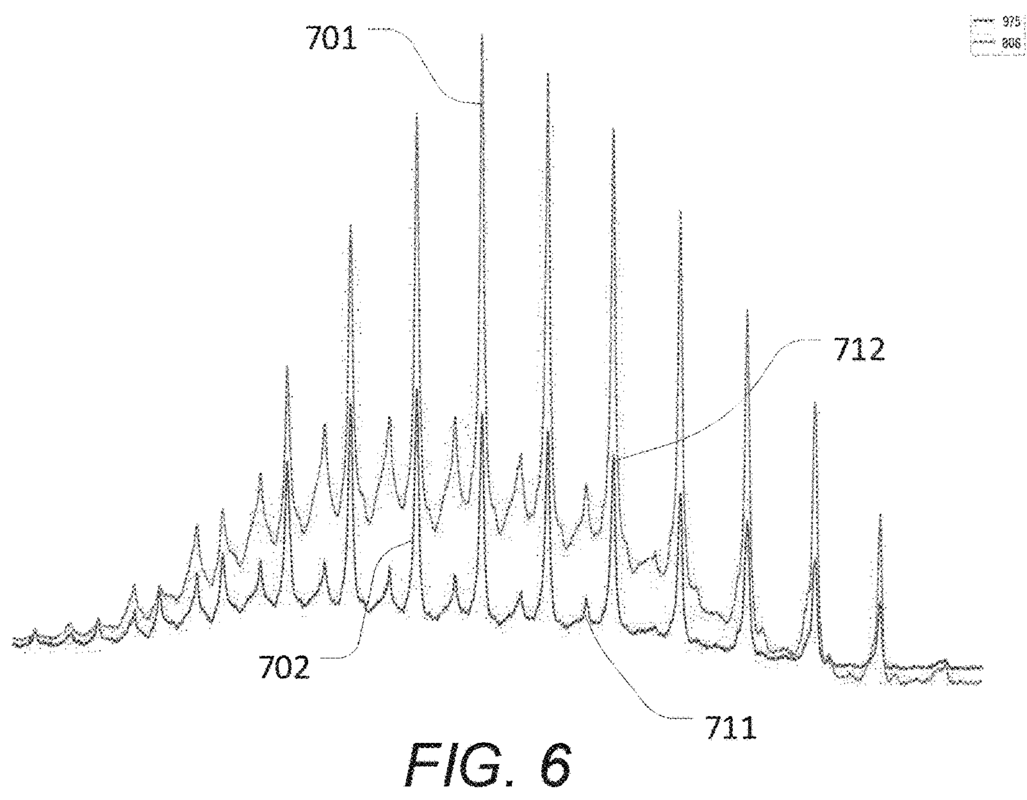

FIG. 6 schematically illustrates an example of de-multiplexed sensor signals from a detector module of an embodiment of an insect sensor as described herein, e.g. an insect sensor as described in connection with FIG. 4 or 5. In this example, the sensor signals from the detector module includes respective time series of detected light intensities at two narrow wavelength bands, e.g. as recorded by respective photodiodes provided with respective bandpass filters or by one of the photodiodes of the array of FIG. 6. In some embodiments, the signal may be integrated or otherwise combined from multiple photodiodes, from an image sensor and/or the like.

In this example, time series 701 corresponds to detected light at 808 nm while time series 702 corresponds to detected light at 970 nm. However, other embodiments may use other wavelengths and/or more than two wavelengths or wavelength bands.

The processing unit of an insect sensor may process the time series to detect the presence of an insect in the probe volume and to determine one or more attributes of the detected insect. Alternatively, some or all of the signal and data processing may be performed by a data processing system external to the insect sensor.

In the present example, the process implemented by the processing unit and/or an external data processing system may detect the presence of detected radiation above a predetermined threshold and/or determine a fundamental harmonic of the detected frequency response so as to detect the presence of an insect, i.e. to identify an insect detection event.

For example, in one embodiment, the processing unit of the insect sensor records data for a given interval (e.g. an interval between 1 s and 600 s), extracts events and metadata and then starts a new recording. The recorded data may include respective time series of the de-multiplexed channels of sensor signals.

To extract the events from the recorded raw data, the process estimates a rolling temporal mean and standard deviation. To this end, in each window, the data is reduced by a factor 10 before the mean and standard deviation is calculated.

An event threshold is then defined by multiplying the estimated standard deviation with a signal to noise factor (SNR), resulting in a threshold map representing the data of the respective channels.

Finally, the estimated rolling mean is removed from the signal and the events are extracted by applying the threshold map. The data associated with the extracted events are stored on the insect sensor and uploaded, e.g. via cellular connection, to a cloud database or other suitable data repository as soon as a connection is available. In cases where no cellular or other data connection is available, it is possible to store the extracted events locally on the insect sensor device.

A process implemented by a cloud service or another type of data processing system external to the insect sensor, e.g. data processing system 200 of previous figures, may perform data processing of the recorded data associated with the detected insect detection events. It will be appreciated, however, that some or even all of the subsequent processing may also be performed locally on the insect sensor.

In any event, the process may compute one or more attributes of the insects associated with the detected insect events. Examples of such attributes include a fundamental wing beat frequency (WBF), a body-wing ratio (BWR) and a melanisation ratio (MEL).

For example, the process may compute the fundamental wing beat frequency (WBF) from the determined fundamental harmonic of the frequency response of a detected detection event. The process may compute the body-wing ratio as a mean ratio between a wing and body signal. The body signal may be determined as a baseline signal 711 of a detection event which represents the scattering from the insect with closed wings while the wing signal may be determined as the signal levels 712 at the peaks in scattering.

The melanisation ratio may be determined as a mean ratio between the signal strengths of the two recorded channels during a detection event.

Based on datasets of one or more of the above attributes and one or more images both of which are associated with an insect detection event, a training dataset for a machine-learning model may be created, or the detected insect may be classified and/or identified. For example, the classification and/or identification of the insect can be performed by an algorithm created by a machine-learning model trained using the training dataset.

Generally, embodiments of the apparatuses described herein may provide fast observation times, e.g. so as to reliably detect insects even in situations of high insect activity. Moreover, embodiments of the apparatuses described herein provide long enough observation times to be able to reliably determine attributes of the insects, such as of the flying insects.

Figure 7:
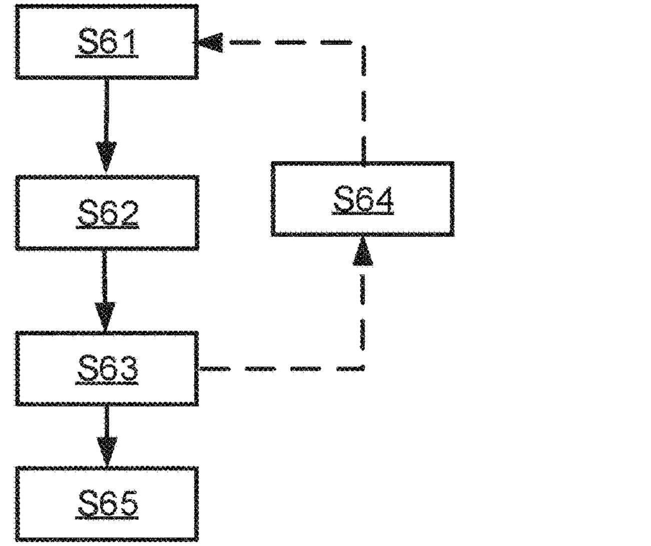
FIGS. 7 and 8 show flow diagrams of examples of a method for detection of insects, FIG. 9 schematically illustrates an insect detection system according to some embodiments, FIG. 10 schematically illustrates an insect detection system according to some embodiments.

FIG. 7 shows a flow diagram of an example of a method for detection of insects.

In step S61, an insect sensor acquires sensor data indicative of detected insects, in particular airborne insects, detected in a probe volume of the insect sensor, and indicative of at least one insect signature. An insect signature is one or more measurable attributes, such as optically detectable attributes, which can be utilized in the classification of the detected insect. Examples of an insect signature is: a wing beat frequency, a trajectory, a body-wing ratio, a relative or absolute total size, a relative or absolute body size, a relative or absolute wing size, a glossiness measure, a melanisation measure, etc.

Each insect detection event may be associated with a current position of the probe volume within an area, i.e. with a current position of the insect sensor. As the insect sensor traverses at least a portion of the target area, the sensor data represents a plurality of insect detection events associated with respective positions within the target area. The sensor data may include time information indicative of the detection time of respective insect detection events. The insect sensor communicates the sensor data to a data processing system for further processing. The data processing may be external to the insect sensor, e.g. as described in connection with FIG. 1, or it may be integrated with the insect sensor.

The process may further acquire sensor position data indicative of the position of the insect sensor within the target area at respective times. Accordingly, based on the sensor position data and the detection times, the process may associate each insect detection event with a corresponding detection position at which the insect detection event has been detected. Alternatively, the process may associate insect detection events with respective positions in a different manner.

The process further obtains additional information from the insect sensor indicative of one or more attributes associated with respective detection events, attributes from which the type of insects can be derived or estimated. Additionally, the process may receive information indicative of an operational state of the insect sensor at respective times and/or at respective positions. The information indicative of the operational state may include information about whether the insect sensor is currently acquiring sensor data, information about a current signal-to-noise ratio or other indicators indicative of a current signal quality.

In step S62, a trigger signal is sent to one or more image sensors in response to an insect detection event. The trigger signal may be sent by a processing unit comprised in the insect sensor or by a data processing system as described herein.

In step S63, in response to the trigger signal, the one or more image sensors each obtains one or more images of at least part of the probe volume of the insect sensor.

The process may at this time return to step S61 in order to obtain more sensor data and images before continuing.

In step S64, the sensor unit may transmit the sensor data and the one or more images to a data processing system or store the sensor data and the one or more images locally.

In step S65, a data processing system or one or more distributed processing units creates one or more classification datasets, which may e.g. be used to create training datasets for a machine-learning model, by pairing the acquired sensor data with the one or more images from each of the one or more image sensors. The one or more training datasets may be provided to a machine-learning model, which is configured to being trained to classify the acquired sensor data into respective types, e.g. species, of insects based on the dataset of acquired sensor data and image data.

Figure 8:
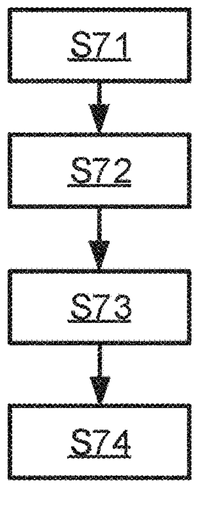

FIG. 8 shows a flow diagram of an example of a method for detection of insects. In step S71, as described above for step S61, an insect sensor acquires sensor data indicative of detected insects, in particular airborne insects, detected in a probe volume of the insect sensor. The sensor data may further comprise at least one insect signature.

In step S72, as described above for step S62, a trigger signal is sent to the image sensor in response to an insect detection event.

In step S73, as described above for step S63, in response to the trigger signal, one or more image sensors each obtains one or more images of at least part of the probe volume of the insect sensor.

In step S74, the insect detection system classifies and/or identifies the detected insect based at least on the one or more images and/or at least on an insect signature. The classification and/or identification may be done by an algorithm created by a machine-learning model, which has been trained using training datasets created from classification datasets such as those created in step S65 described above.

Figure 9:
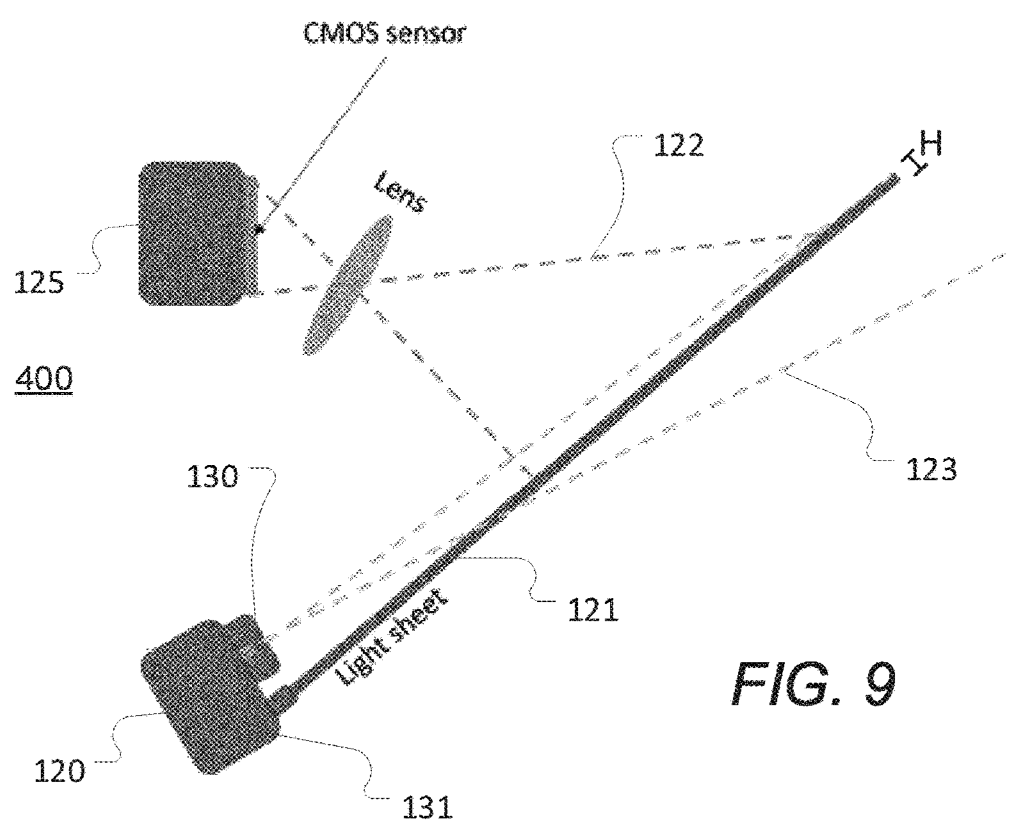

FIG. 9 schematically illustrates an insect detection system according to some embodiments. The system, generally designated by reference numeral 400, comprises an insect sensor 120 and an image sensor 125. The insect sensor is an optical insect sensor comprising an illumination module 131 configured to illuminate the probe volume with illumination, and a detector module 130 comprising a detector configured to detect light from the probe volume. The illumination module 131 creates a light sheet 121.

In the figure the system is shown from the side, where the light sheet is effectively a collimated beam. A view from above (not shown) would show a largely divergent light sheet 121. The green dashed lines indicate the field of view 122 of the image sensor, the dashed yellow line shows the field of view 123 of the insect sensor detector module 130.

The light sheet 121 (indicated by the red line) is in the middle of the depth of field of the image sensor.

The light sheet 121 will diverge 45-120 degrees full angle in one spatial dimension and less than 5 degrees in the other spatial dimension and may comprise 1-10 infrared lasers or LEDs to cover a large area. When an insect flies through the light sheet, the light is reflected and picked up by the detector, which in turn sends a trigger signal to the image sensor 125 to record one or more images. The image sensor 125 may further comprise an emitter, which acts as a flash to illuminate the insect when the one or more images are obtained.

The receiver of the image sensor may be a 2-dimensional CMOS-sensor that is tilted so that it fulfils the Scheimpflug principle, which means the light sheet 121 and the receiver of the image sensor essentially constitute a Scheimpflug LIDAR. In this way the receiver of the image sensor 125 and the light sheet 121 are mounted in one plane and cover a large area. Due to physical limitations, the depth of field of the image sensor may be a couple of centimetres, which in turn means that the light from the optical insect sensor needs to be thin such that the position of the insect is well defined, when the image sensor obtains images. The height H of a single light sheet may therefore also only be just a couple of cm.

Assuming an average (or maximum) speed v of insects, the distance x an insect will cover after passing the light sheet is $$x=v*t$$

where t is the delay between the insect detection event and the recording of images.

Figure 10:
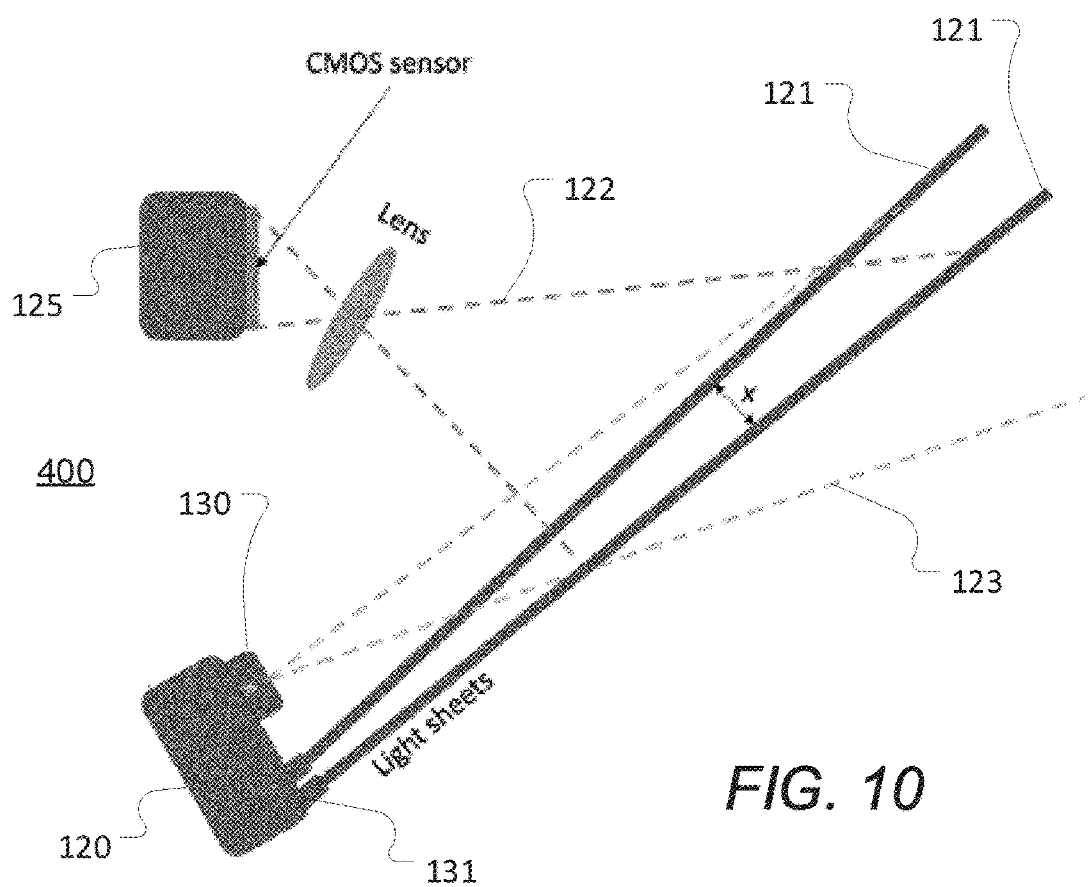

FIG. 10 schematically illustrates an insect detection system according to some embodiments.

The insect detection system shown in FIG. 10 is similar to the one shown in FIG. 9 and for the most part only those features that separate the embodiments of FIGS. 9 and 10 are mentioned in the following.

The illumination module of the insect sensor is configured to create two light sheets, which will create two probe volumes, one for each light sheet. The depth of field of the image sensor 125 may be thin, which means there will be a delay between the breaking of the light sheet by an insect and the recording of one or more images by the image sensor 125. With two or more light sheets there is time for the insect to fly to the volume, where it will be in focus when the one or more images are recorded. For example, the two light sheets may be placed on either side of the depth of field of the image sensor 125 (or even with some distance from the outer borders of the depth of field). Further, the light sheets 121 may be arranged to have a distance x between them at a point within the field of view of the image sensor, where x is the distance an insect is expected to cover after passing the light sheet.

Figures 11, 12:
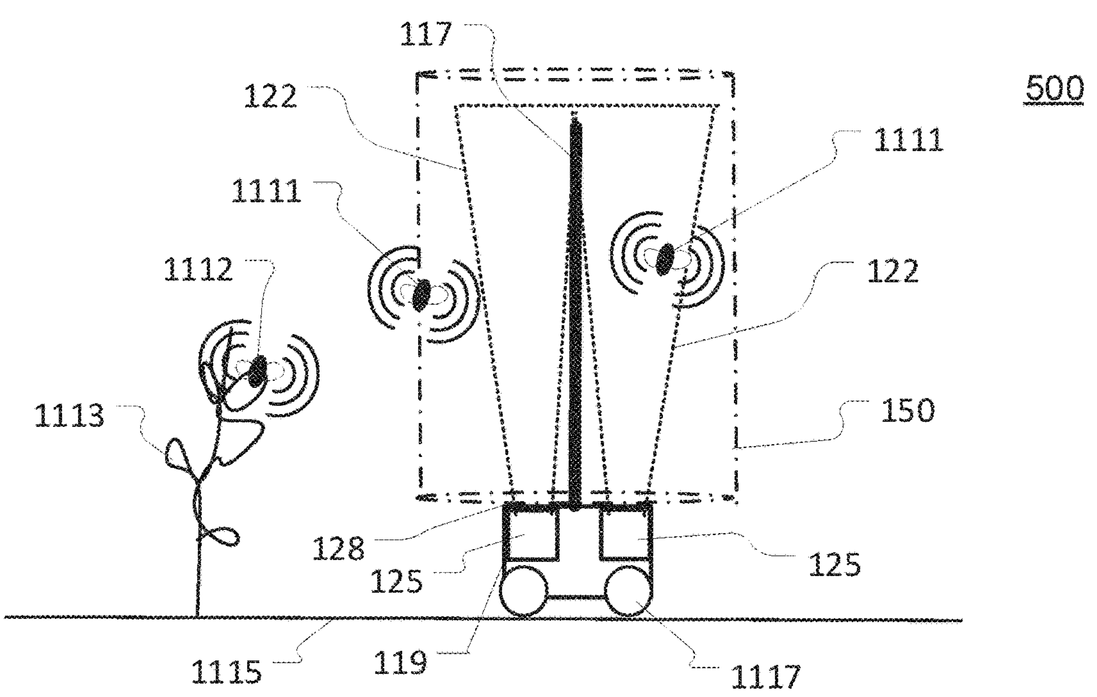
FIG. 11 shows a schematic view of a movable insect detection system according to some embodiments.
FIG. 12 shows a schematic view of a sensor setup comprising an insect sensor and a plurality of image sensors.

FIG. 11 schematically illustrates an insect detection system according to some embodiments. The system, generally designated by reference numeral 500, comprises a sensor unit 128 configured for capture and digitalisation of signals resulting from electric field measurements for use in the detection of insects.

The sensor unit 128 comprises a housing 119 and a probe 117, which is mounted on the housing 119 and connected to electronic components within the housing 119.

The sensor unit 128 shown in FIG. 11 comprises wheels 1117 as a propulsion mechanism and is self-propelled. Thus, the sensor unit 128 shown in FIG. 11 may be a fully independent autonomous unit. Alternatively, the sensor unit 128 could be part of a manually driven, semi-autonomous or autonomous vehicle. For example, the sensor unit could be part of a tractor, a movable farming machine, a spraying boom, or other agricultural vehicle, an unmanned aerial vehicle, a self-driving robot, or the like. Yet alternatively, the sensor unit 128 may be configured as a purely stationary unit. The sensor unit 128 could thus be deployable anywhere, such as for movement on the ground 1115, and be configured to continually or intermittently acquire data either from a fixed position or during traversal of an area.

The sensor unit 128 is configured to acquire electric field data and the probe 117 may be an antenna configured for passive detection, which has the advantage that such a probe requires little power. For example, the probe 117 may be an electric field probe.

The sensor unit may comprise one or more electric field (E-field) sensors configured to acquire frequency-modulated electric field data. The frequency of the modulation of the electric field data may be in a frequency range below and including 22 kHz. The sensor unit may be configured to measure electric fields in the reactive near-field region of an insect.

Insects may modulate electric fields around them. For example, winged insects may cause a modulation of a surrounding electric field as they beat their wings, where the modulation is correlated or associated with one or more wing beat frequencies of a freely flying insect 1111 or of a perched insect 1112 beating its wings while it is sitting on a surface such as a plant or crop 1113. The measured modulated electric field data are processed and used to determine one or more insect signatures, which can be determined at least in part on the basis of the processed data.

The sensor unit is configured to acquire the frequency modulated electric field data in a frequency range suitable for being used in the detection of insects within a probe volume 150 surrounding the probe 117. The probe volume 150 of the sensor unit shown in FIG. 11 is cylindrical, but other sensor unit comprising one or more E-sensors may have probe volumes with other shapes.

The sensor unit 128 may comprise a data processing system configured for processing of the acquired modulated electric field data, and for determination of one or more insect signatures based at least in part on the processed electric field data. Alternatively, some or all of the processing steps may be performed by a processing unit external to the sensor unit 128.

The insect detection system 500 further comprises two image sensors 125, which are positioned such that each image sensor 125 can take digital images of at least part of the probe volume 150 of the insect unit 128.

In some embodiments, the sensor unit 128 comprises, or is communicatively coupled to, one or more additional sensors, such as one or more environmental sensors for sensing environmental data, such as weather data. The one or more additional sensors may be deployed in the same geographic area as the sensor unit. Examples of environmental data include ambient temperature, humidity, amount of precipitation, wind speed, etc. The one or more additional sensors may be included in the sensor unit 19, in the vehicle, or they may be provided as a separate unit, e.g. a weather station, that may be communicatively coupled to one or more sensor units and/or to the external data processing system.

The data recorded, and possibly processed, by the sensor unit 128 may be stored locally by the sensor unit or by a vehicle, which the sensor is part of, for subsequent retrieval from the sensor unit, e.g. after a given time or after traversal of a geographic area. To this end, the sensor unit or vehicle may include a local data storage device for logging the data and for allowing the stored data to be retrievable e.g. via a data port or a removable data storage device.

An external data processing system 200, e.g. such as that shown in FIG. 2, may be configured, e.g. by a suitable computer program, to receive data, such as sensor data and possibly other data such as e.g. position data, environmental data, etc., from a sensor unit 128. That is, the insect sensor and/or the image sensor may be communicatively coupled, for example wirelessly, to an external data processing system as described in connection with other embodiments, and may be configured to communicate acquired sensor data and/or image data to such a data processing system.

FIG. 12 shows a schematic view of a sensor setup comprising an insect sensor 120 and a plurality of image sensors 125*a-d*. Four image sensors 125*a-d* are arranged with respect to an insect sensor 120 such that the respective field-of-view 122*a-d* of each image sensor overlaps at least partly with the probe volume 150 of the insect sensor 120. The field-of-view of an image sensor is shown as a dotted line, where it overlaps with the field-of-view of another image sensor or with the probe volume of the insect sensor. Having a plurality of image sensors each taking one or more images means that the images taken will cover a larger part of the probe volume.

Often, multiple configurations for the positioning of a plurality of image sensors around a probe volume will be possible. The four image sensors 125*a-d* shown in FIG. 12 are positioned along a common axis with the probe volume 150 of the insect sensor 120. For example, image sensors may be positioned on a common axis with a light detector in an optical insect sensor.

Each of the images sensors 125*a-d* can be configured to have a focus plane and/or depth of field that is different from that of the other image sensors. The respective focus plane 124*a-d* of each of the four image sensors is shown as a stylised line for illustration of how using a plurality of image sensors means that a larger part of the probe volume will be in focus when compared to a setup using a single image sensor. In actuality, the focus plane of each of the image sensors shown in FIG. 12 would be at an angle to the other focus planes as the image sensors are placed at different angles around the insect sensor.

Some, or all, of the image sensors 125*a-d* may further comprise an emitter, which acts as a flash to illuminate the probe volume when one or more images are obtained. Alternatively, one or more flash emitters may be positioned elsewhere as part of the insect detection system. For example, two flash emitters may be positioned on either side of the probe volume to illuminate it from two sides. Advantageously, any flash emitter may be positioned adjacent to or near the probe volume to reduce or avoid shadows being cast into the probe volume by the light from the flash emitter striking another component of the insect detection system.

The invention claimed is:

1. An insect detection system for detection of insects, the insect detection system comprising:

an insect sensor configured to provide acquired sensor data indicative of one or more insect detection events, each insect detection event being indicative of one or more detected insects in a probe volume of the insect sensor, the acquired sensor data being further indicative of at least one insect signature, and one or more image sensors each configured to obtain one or more digital images of at least part of the probe volume of the insect sensor, wherein the insect detection system is configured to create one or more classification datasets by pairing the acquired sensor data with the one or more digital images from each of the one or more image sensors, and wherein the probe volume of the insect sensor is realized by overlapping a light sheet that illuminates the object plane of the image sensor with the field of view of a detector module that covers the light sheet, the detector module being configured to detect light from the probe volume.

2. The insect detection system for detection of insects according to claim 1, wherein the insect detection system comprises two or more image sensors each configured to obtain one or more digital images of at least part of the probe volume of the insect sensor.

3. The insect detection system for detection of insects according to claim 1, wherein the insect detection system is configured to pair the acquired sensor data with the one or more images from each of the one or more image sensors by grouping according to time stamps associated with the acquired sensor data and with the one or more digital images.

4. The insect detection system for detection of insects according to claim 1, wherein the insect detection system is further configured such that the one or more image sensors are triggered in response to an insect detection event.

5. The insect detection system for detection of insects according to claim 1, wherein each of the one or more image sensors is configured to record images in one or more ranges of electromagnetic radiation within the visible spectrum, IR wavelengths, and/or UV wavelengths.

6. The insect detection system for detection of insects according to claim 1, wherein the insect sensor and the one or more image sensors are mounted on a movable entity comprising a propulsion mechanism, or wherein the insect sensor and one or more image sensors are configured to be mountable on a movable entity.

7. The insect detection system for detection of insects according to claim 1, wherein the insect sensor is an optical insect sensor comprising:

an illumination module configured to illuminate the probe volume with illumination, and;

a detector module comprising a detector configured to detect light from the probe volume.

8. The insect detection system for detection of insects according to claim 1, wherein the probe volume of the insect sensor is realized by overlapping an expanded light source that illuminates a volume in front of the insect sensor within the field of view of a detector module, the detector module being configured to detect light from the probe volume.

9. The insect detection system for detection of insects according to claim 1, wherein the insect sensor comprises one or more E-field sensors each configured to acquire frequency-modulated electric field data, wherein the frequency of the modulation is in the frequency range between 0.01 kHz and 22 kHz, or between 0.01 kHz and 5 kHz, or between 0.01 kHz and 2 kHz, or between 0.01 kHz and 1 kHz.

10. The insect detection system for detection of insects according to claim 1, wherein the insect detection system is further configured to create one or more training datasets for a machine-learning model from the one or more classification datasets.

11. The insect detection system for detection of insects according to claim 10, wherein the insect detection system further comprises a data processing system, and wherein the data processing system comprises a machine-learning model that is configured to receive the one or more training datasets, the machine-learning model being configured to being trained to classify the acquired sensor data into respective types or species of insect from the one or more training datasets.

12. An insect detection system for detection of insects, the insect detection system comprising:

an insect sensor configured to provide acquired sensor data indicative of one or more insect detection events, each insect detection event being indicative of one or more detected insects in a probe volume of the insect sensor, the acquired sensor data being further indicative of at least one insect signature, and one or more image sensors each configured to obtain one or more digital images of at least part of the probe volume of the insect sensor, wherein the insect detection system is configured to create one or more classification datasets by pairing the acquired sensor data with the one or more digital images from each of the one or more image sensors, and wherein the insect sensor comprises one or more E-field sensors each configured to acquire frequency-modulated electric field data, wherein the frequency of the modulation is in the frequency range between 0.01 kHz and 22 kHz, or between 0.01 kHz and 5 kHz, or between 0.01 kHz and 2 kHz, or between 0.01 kHz and 1 kHz.

13. The insect detection system for detection of insects according to claim 12, wherein the insect detection system comprises two or more image sensors each configured to obtain one or more digital images of at least part of the probe volume of the insect sensor.

14. The insect detection system for detection of insects according to claim 12, wherein the insect detection system is configured to pair the acquired sensor data with the one or more images from each of the one or more image sensors by grouping according to time stamps associated with the acquired sensor data and with the one or more digital images.

15. The insect detection system for detection of insects according to claim 12, wherein the insect detection system is further configured such that the one or more image sensors are triggered in response to an insect detection event.

16. The insect detection system for detection of insects according to claim 12, wherein each of the one or more image sensors is configured to record images in one or more ranges of electromagnetic radiation within the visible spectrum, IR wavelengths, and/or UV wavelengths.

17. The insect detection system for detection of insects according to claim 12, wherein the insect sensor and the one or more image sensors are mounted on a movable entity comprising a propulsion mechanism, or wherein the insect sensor and one or more image sensors are configured to be mountable on a movable entity.

18. The insect detection system for detection of insects according to claim 12, wherein the insect sensor is an optical insect sensor comprising:

an illumination module configured to illuminate the probe volume with illumination, and;

a detector module comprising a detector configured to detect light from the probe volume.

19. The insect detection system for detection of insects according to claim 12, wherein the probe volume of the insect sensor is realized by overlapping an expanded light source that illuminates a volume in front of the insect sensor within the field of view of a detector module, the detector module being configured to detect light from the probe volume.

20. The insect detection system for detection of insects according to claim 12, wherein the insect detection system is further configured to create one or more training datasets for a machine-learning model from the one or more classification datasets.

* * * * *